US006971780B2

(12) United States Patent
Lee et al.

(10) Patent No.: US 6,971,780 B2
(45) Date of Patent: Dec. 6, 2005

(54) LIQUID CRYSTAL DISPLAY DEVICE HAVING A NOISE SHIELDING MEMBER

(75) Inventors: Tae-Jin Lee, Gyeonggi-do (KR); Jong-Dae Park, Seoul (KR); Jeong-Hwan Lee, Suwon-si (KR); Yong-Seok Choi, Suwon-si (KR); Byung-Woong Han, Incheon-si (KR)

(73) Assignee: Samsung Electronics Co., Ltd., (KR)

( * ) Notice: Subject to any disclaimer, the term of this patent is extended or adjusted under 35 U.S.C. 154(b) by 134 days.

(21) Appl. No.: 10/452,500

(22) Filed: Jun. 2, 2003

(65) Prior Publication Data

US 2003/0223249 A1  Dec. 4, 2003

(30) Foreign Application Priority Data

Jun. 3, 2002 (KR) ................................. 2002-31085
Aug. 17, 2002 (KR) ....................... 10-2002-0048691
Nov. 29, 2002 (KR) ....................... 10-2002-0075134

(51) Int. Cl.[7] ..................... G02F 1/13357; F21V 9/14; F21V 5/00

(52) U.S. Cl. .................. 362/561; 362/19; 362/224; 362/330; 362/331; 349/59; 349/64

(58) Field of Search ................. 349/59, 62, 64, 349/70, 96; 362/19, 223–225, 558, 561, 29, 362/330, 331

(56) References Cited

U.S. PATENT DOCUMENTS

| 5,195,822 | A | * | 3/1993 | Takahashi et al. | 349/62 |
|---|---|---|---|---|---|
| 5,214,522 | A | * | 5/1993 | Tagawa | 349/64 |
| 5,280,371 | A | * | 1/1994 | McCartney et al. | 349/64 |
| 5,333,073 | A | * | 7/1994 | Suzuki | 349/59 |
| 5,432,626 | A | * | 7/1995 | Sasuga et al. | 349/59 |
| 5,870,160 | A | * | 2/1999 | Yanagawa et al. | 349/96 |
| 6,654,088 | B2 | * | 11/2003 | Morishita et al. | 349/62 |

* cited by examiner

Primary Examiner—Alan Cariaso
(74) Attorney, Agent, or Firm—Cantor Colburn LLP

(57) ABSTRACT

Disclosed is an LCD device including a noise shielding member. The noise shielding member is a transparent conductive member including a transparent film on which a transparent conductive layer is coated. The noise shielding member may also be a transparent conductive layer scattered on the optical sheets. The transparent conductive layer comprises ITO or IZO. The noise shielding member is disposed under the diffusing plate or interposed between optical sheets. The noise shielding member may be disposed under the LCD panel. The noise generated from the electric power signal applied to the lamp of the backlight assembly is shielded from the LCD panel. Furthermore, the noise shielding member and optical sheets contacts with the chassis of the LCD device through various ground members so as to be connected to earth potential and be electrically stabilized. Accordingly, display quality of the LCD device is improved.

30 Claims, 14 Drawing Sheets

LIQUID CRYSTAL DISPLAY DEVICE HAVING A NOISE SHIELDING MEMBER

CROSS-REFERENCE OF RELATED APPLICATIONS

This application relies for priority upon Korean Patent Application No. 2002-31085 filed on Jun. 3, 2002, Korean Patent Application No. 2002-75134 filed on Nov. 29, 2002, and Korean Patent Application No. 2002-48691 filed on Aug. 17, 2002, the contents of which are herein incorporated by reference in their entirety.

BACKGROUND OF THE INVENTION

1. Field of the Invention

The present invention relates to a liquid crystal display device, and more particularly, to a liquid crystal display device having a noise shielding means for shielding a noise generated from a power voltage signal applied to a light source from a liquid crystal display panel of the liquid crystal display device.

2. Description of the Related Art

Display devices as information processing devices have various shapes and functions. The display device functions as an interfacing devices between users and the information processing devices such that the users can identify the information processed by the information processing devices.

Among those display devices, a liquid crystal display (LCD) device is widely used since the LCD device can be manufactured to be lighter and thinner and can provide full-color and higher resolutions.

The LCD device displays information by using the optical properties of the liquid crystal molecules. Since the liquid crystal is not able to emit a light by itself, the LCD device using the liquid crystal requires a light source so as to display an image. Accordingly, the LCD device usually employs additional light source. The LCD device usually displays an image using the light supplied from a backlight assembly.

The backlight assembly is classified into a direct-illumination type and an edge-illumination type depending on the position of the light source such as a lamp. In the edge-illumination type backlight assembly, the lamp is disposed adjacent to at least one side face of a liquid crystal display panel for displaying an image, and the light exiting from the lamp is provided to the liquid crystal display panel through a light-guide plate. The light-guide plate changes the path of the light supplied from the lamp. The edge-illumination type backlight assembly has advantages of superior light uniformity and long endurance. The LCD device employing the edge-illumination type backlight assembly may have a thinner structure compared with the LCD device employing the direct-illumination type backlight assembly. For this reason, the edge-illumination type backlight assembly is usually installed in the LCD devices having a relatively small screen such as the LCD devices used in the laptop computers or desktop computers.

In the direct-illumination type backlight assembly, the lamps are disposed under the liquid crystal display panel, and the light exiting from the lamp does not pass through the light-guide plate and is directly incident into the liquid crystal display panel. That is, a plurality of the lamps parallel with one another is disposed under the liquid crystal display panel, the light exiting from the lamps is irradiated onto an entire surface of the liquid crystal display panel, so that the direct-illumination type backlight assembly provides higher luminance compared with the edge-illumination type backlight assembly. For this reason, the direct-illumination type backlight assembly is usually installed in LCD devices having a relatively large screen.

However, the LCD devices have the following problems due to the backlight assembly.

The liquid crystal display panel usually includes a thin film transistor (TFT) substrate, a color filter substrate and a liquid crystal layer interposed between the TFT substrate and the color filter substrate. When an image signal is applied to the liquid crystal molecules, the arrangement of the liquid crystal molecules is changed according to the electric field applied to the liquid crystal molecules, and the optical characteristics of the liquid crystal layer is change. The liquid crystal display device displays the image using the changes of the transmissivity of the light passing through the liquid crystal layer.

The voltage level for driving the liquid crystal display panel is in a range from several volts to tens of volts since the voltage for driving the liquid crystal display panel is used only to change the arrangement of the liquid crystal molecules. However, the voltage level for driving the backlight assembly is in a range from several hundreds volts to several thousands volts. The voltage for driving the liquid crystal display panel is used only to change the arrangement of the liquid crystal molecules, however, the voltage level for driving the backlight assembly is in a range from several hundreds volts to several thousands volts since the voltage for driving the backlight assembly is used to turn on the lamp so as to generate the light. In particular, in case of the LCD device including the direct-illumination type backlight assembly, a plurality of lamps is simultaneously driven so that the voltage applied to the backlight assembly is hundreds or thousands times higher than the voltage applied to the liquid crystal display panel.

Since the intensity of an electric field is proportional to the voltage, the intensity of the electric field applied to the backlight assembly is hundred or thousands times higher than the intensity of the electric field applied to the liquid crystal display panel. Therefore, the electrical characteristics of the liquid crystal display panel into which the image signal is applied may be affected by the electromagnetic waves due to the high voltage signal applied to the lamps. When the image signal is disturbed by the electromagnetic waves due to the high voltage signal applied to the lamps, the desired image may not be displayed on the liquid crystal display panel. The electromagnetic waves may be generated by the electric field caused by the voltage applied to the lamp and by other electromagnetic changes during the discharge of the lamp. The electromagnetic waves due to the high voltage signal applied to the lamps cause electromagnetic disturbance in the liquid crystal display panel and changes the electromagnetic characteristics of the liquid crystal display panel, so that display failure may occur. Hereinafter, the electromagnetic waves due to the high voltage signal applied to the lamps are referred to as a noise.

Accordingly, the display quality of the LCD device may be deteriorated by the electromagnetic disturbance. In particular, the display quality may be deteriorated remarespecially in the LCD device including the direct-illumination type backlight assembly since a plurality of lamps is disposed under the liquid crystal display panel.

SUMMARY OF THE INVENTION

Accordingly, the present invention is directed to a backlight assembly, a liquid crystal display panel and a liquid crystal display having the same that substantially obviate one or more problems due to limitations and disadvantages of the related art.

It is a first feature of the present invention to provide a backlight assembly for display devices, the backlight assembly being capable of shielding a display panel for displaying an image from the noise. It is a second feature of the present invention to provide a display panel for displaying an image, the display panel being capable of protecting the noise. It is a third feature of the present invention to provide an LCD device capable of shielding the LCD panel from the noise.

According to an aspect of the present invention for achieving the first feature of the present invention, there is provided a backlight assembly which comprises a receiving container including a receiving space, a light source for generating a first light, a light-distribution changing means for changing an optical distribution of the first light, and a noise shielding means for shielding a noise generated from an electrical power applied to the light source. The receiving space is defined by a bottom surface and a plurality of sidewalls protruded from an edge portion of the bottom surface. The light source is disposed over the bottom surface.

The light-distribution changing means includes a light diffuser and a plurality of light concentrator for concentrating a light. The light diffuser diffuses the first light exiting from the light source, and the light concentrator is disposed over the light diffuser and enhances a luminance of a second light exiting from the light diffuser. A supplementary light diffuser may be disposed under the optical sheets for more diffusing the second light. The noise shielding means may be a transparent conductive sheet disposed under the light diffuser. The transparent conductive sheet may also be disposed between the light diffuser and the supplementary light diffuser, between the supplementary light diffuser and the light concentrator, or above the light concentrator. The transparent conductive sheet is formed into a transparent film on which a transparent conductive layer such as an ITO layer is deposited. The noise shielding means may be a transparent conductive layer coated on a front or rear surface of the light diffuser. The transparent conductive layer may also be coated on a front or a rear surface of the supplementary light diffuser, or a front or a rear surface of the light concentrator.

According to an aspect of the present invention for achieving the second feature of the present invention, there is provided a display panel which comprises an upper and a lower substrate, a liquid crystal layer including liquid crystal, and a noise shielding means for shielding a noise. The lower substrate is coupled to the upper substrate and the liquid crystal is disposed between the upper substrate and the lower substrate. An electrical power is applied to the liquid crystal, and arrangement of molecules of the liquid crystal is changed. The noise shielding means may be a transparent conductive layer coated on a rear surface of the lower substrate. The noise shielding means may also be an additional conductive polymer sheet. For example, the transparent conductive layer is an ITO layer or an IZO layer.

According to an aspect of the present invention for achieving the third feature of the present invention, there is provided an LCD device which comprises an LCD panel for displaying an image, a backlight assembly for providing a light to the display panel, a noise shielding means for shielding a noise generated in a light source, and a receiving container for receiving the LCD panel and the backlight assembly.

The LCD panel includes an upper substrate and a lower substrate coupled to each other, and a liquid crystal disposed between the upper substrate and the lower substrate. An electrical power is applied to the liquid crystal from an exterior so that arrangement of molecules of the liquid crystal is changed. The noise shielding means is disposed under the lower substrate. The LCD panel further includes a polarizer under the lower substrate, and the noise shielding means may be conductive particles scattered on the polarizer.

The backlight assembly includes a light source for generating a first light, a light-distribution changing means for changing an optical distribution of the first light. The light-distribution changing means includes a light diffuser for diffusing the first light exiting from the light source, and a light concentrator for concentrating a second light exiting from the light diffuser. The light diffuser is disposed over the light source and diffuses the first light, so that a surface light source is provided using the lamps of a line light source. The light concentrator is disposed over the light diffuser. The light-distribution changing means may further include a supplementary light diffuser for further diffusing the second light exiting from the light diffuser.

The noise shielding means may be a transparent conductive sheet including a transparent film a transparent conductive layer coated on the transparent film, and disposed under the light diffuser. The transparent conductive sheet may also be disposed between the light diffuser and the supplementary light diffuser, between the supplementary light diffuser and the light concentrator, or over the light concentrator. As another exemplary embodiment, the noise shielding means is a transparent conductive layer coated on a front or a rear surface of the light diffuser. The transparent conductive layer may also be coated on a front or a rear surface of the light concentrator.

The receiving container includes a bottom surface and a plurality of sidewalls extended from the bottom surface, to thereby form a receiving space for receiving the liquid crystal display panel and the backlight assembly. The light-distribution changing means and the noise shielding means are electrically connected to at least one of the sidewalls. The electrical connection to the sidewalls includes a direct contact to the sidewalls and an indirect contact to the sidewalls through a conductive connecting means. The connecting means may be fixed to the receiving container by a fixing means.

According to the above exemplary embodiments, the noise shielding means comprised of conductive material is formed between the light source and the liquid crystal display panel. Accordingly, the display quality of the LCD device can be improved. Further, the noise shielding means may be connected to an earth potential through a chassis of the LCD device, thereby electrically stabilizing the noise means.

BRIEF DESCRIPTION OF THE DRAWINGS

The above and other features and advantages of the present invention will become readily apparent by reference to the following detailed description when considered in conjunction with the accompanying drawings, in which.

DETAILED DESCRIPTION OF THE INVENTION

The present invention now will be described more fully hereinafter with reference to the accompanying drawings, in which exemplary embodiments of the present invention are shown. This invention may, however, be embodied in many different forms and should not be construed as limited to the embodiments set forth herein.

Figure 1:
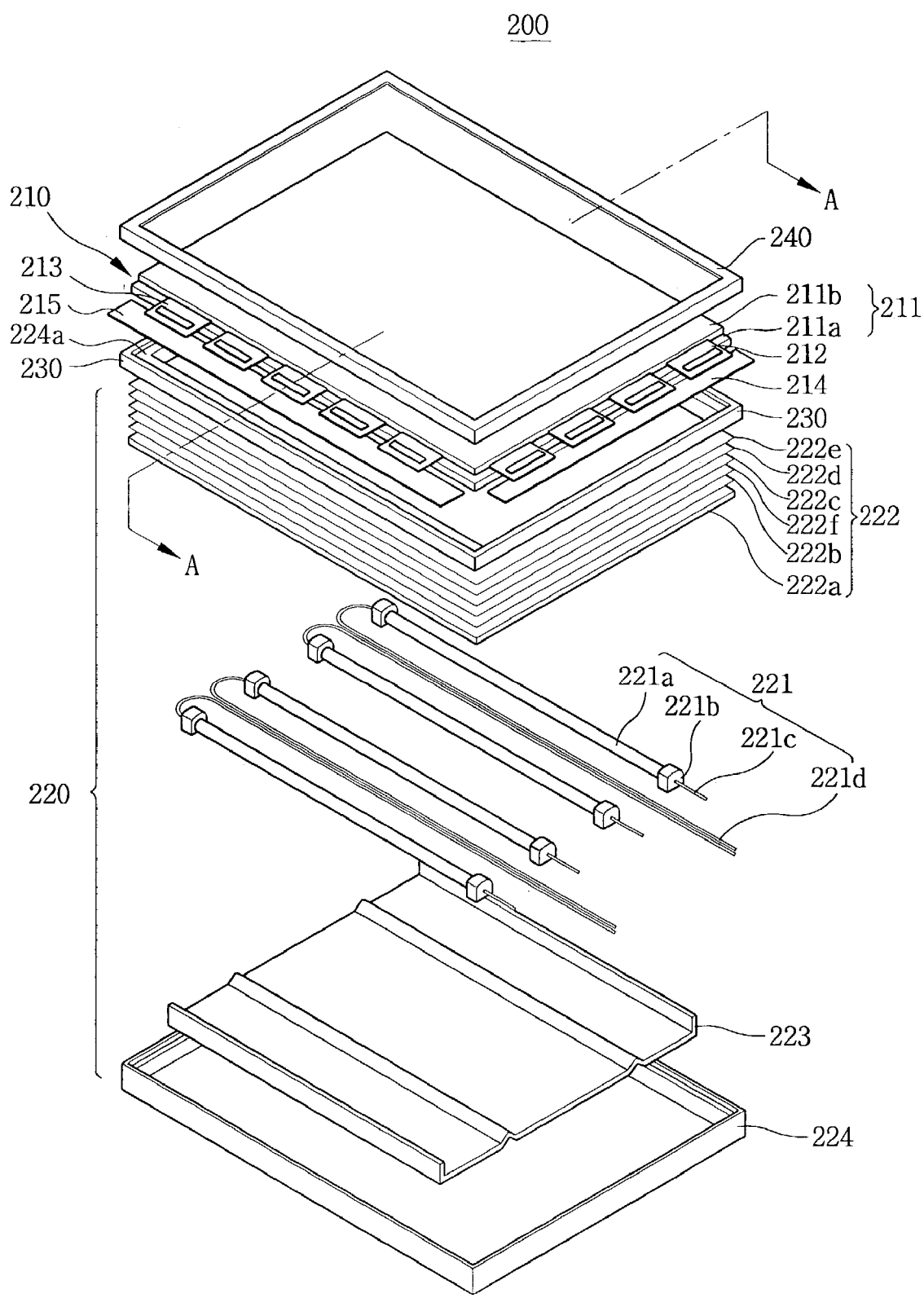
FIG. 1 is an exploded perspective view showing an LCD device including a noise shielding means according to an exemplary embodiment of the present invention.
Figure 2:
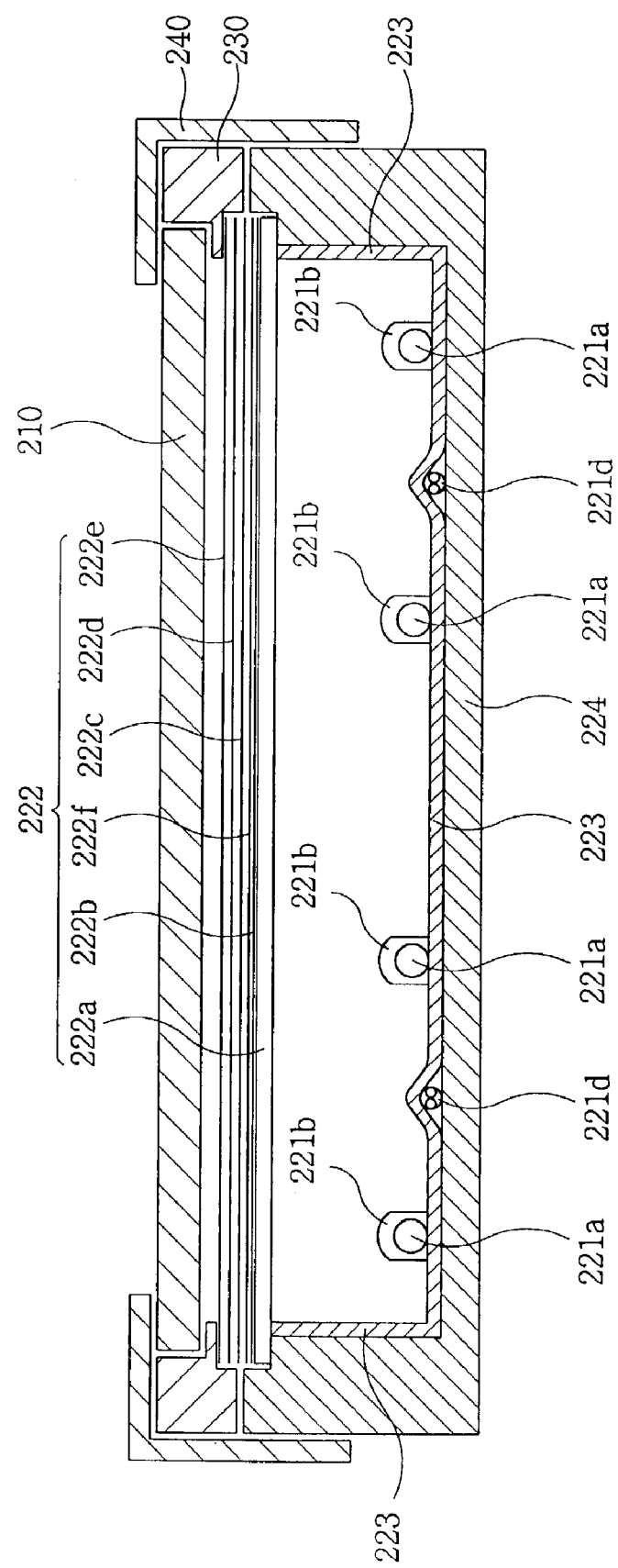
FIG. 2 is a cross sectional view taken along the line A—A of the LCD device shown in FIG. 1.

FIG. 1 is an exploded perspective view showing an LCD device including a noise shielding means according to an embodiment of the present invention, and FIG. 2 is a cross sectional view taken along the line A—A of the LCD device shown in FIG. 1.

Referring to FIG. 1, the LCD device 200 includes a liquid crystal display panel assembly 210 for displaying an image, a backlight assembly 220 for providing light to the liquid crystal display panel assembly 210, a middle chassis 230 for receiving the liquid crystal display panel assembly 210, and a top chassis 240 for fixing the liquid crystal display panel assembly 210.

The liquid crystal display panel assembly 210 includes a liquid crystal display panel 211 for displaying an image according to an applied image signal, a data printed circuit board (PCB) 215, a gate PCB 214, a data tape carrier package (TCP) 213 and a gate tape carrier package (TCP) 212. The liquid crystal display panel 211 includes a TFT substrate 211a on which a plurality of switching devices (TFTs) is arranged, a color filter substrate 211b opposite to the TFT substrate 211a, and a liquid crystal layer (not shown) interposed between the TFT substrate 211a and the color filter substrate 211b.

The backlight assembly 220 includes a light source 221 for generating light, a light-distribution changing means 222 disposed above the light source 221 to change an optical distribution of the light exiting from the light source, a reflecting plate 223 for reflecting light toward the liquid crystal display panel assembly 210, and a receiving container for receiving the backlight assembly 220.

The light source 221 includes a plurality of lamps 221a for emitting light, lamp holders 221b disposed at a first end portion of the lamp 221a and at a second end portion of the lamp 221a opposite to the first end portion, a first power line 221c drawn out from the first end portion of the lamp 221a, and a second power line 221d drawn out form the second end portion of the lamp 221a. An power voltage signal is applied to the lamps 221a through the first and second power lines 221c and 221d, so that light is generated from the lamps 221a. As a result, electromagnetic waves are radiated in all directions due to the voltage applied to the lamps 221a.

One of the power lines 221c and 221d is extended a position adjacent to the other power line so as to connect both of the power lines 221c and 221d to the same power source (not shown). As an exemplary embodiment, the second power line 221d is extended to a position adjacent to the first power line 221c since a relatively low voltage signal is applied to the second power line 221d compared with the first power line 221c. The extended second power line 221d may be disposed under the reflecting plate 223 so as to prevent the second power line 221d from affecting an image display. A receiving space for receiving the second power line 221d may be formed between the reflecting plate 223 and the bottom chassis 224.

The light-distribution changing means 222 includes a diffusing plate 222a and diffusing sheet 222b for diffusing the light exiting from the light source 221, a lower prism sheet 222c and an upper prism sheet 222d for concentrating the diffused light exiting from the diffusing sheet 222b, a protecting sheet 222e for protecting the lower and upper prism sheets 221c and 221d, and a noise shielding sheet 222f for shielding the noise generated from the power voltage signal applied to the light source 221.

The diffusing plate 222a has a rigid shape so as to support a variety of optical sheets disposed over the light source 221 and firstly diffuses the first light exiting from the light source 221. The diffusing sheet 222b is disposed over the diffusing plate 222a and secondly diffuses the light exiting from the diffusing plate 222a.

The noise shielding sheet 222f comprises, for example, a transparent thin film on which a transparent conductive layer is deposited, and is disposed between the diffusing sheet 222b and the lower prism sheet 222c. Therefore, the noise shielding sheet 222f can prevent the noise generated from the power voltage signal applied to the light source 221 from electrically affecting the liquid crystal display panel assembly 210. The transparent conductive layer may comprise indium tin oxide (hereinafter, referred to as ITO) or indium zinc oxide (hereinafter, referred to as IZO). The transparent conductive layer may be deposited on a front surface or a rear surface of the transparent film. The noise generated from the power voltage signal applied to the light source 221 is absorbed by the noise shielding sheet 222f, so that electric interference in the liquid crystal display panel is prevented.

That is, the transparent conductive layer shields the noise due to a high voltage signal, to thereby improve the display quality of the LCD device.

The lower prism sheet 222c and the upper prism sheet 222d concentrates the light exiting from the diffusing sheet 222b and enhance luminance of the light incident onto the liquid crystal display panel assembly 210 when viewed from the front of the liquid crystal display panel assembly 210. The light exiting from the diffusing sheet 222b provides a large viewing angle, and the viewing angle of the light may become small after the light passes through the prism sheets 222c and 222d. Therefore, the luminance of light may be enhanced and power consumption may be reduced.

The protecting sheet 222e is disposed above the upper prism sheet 222d and prevents a variety of foreign matter from sticking to the upper prism sheet 222d.

The receiving container includes a bottom chassis 224 as a first receiving container for receiving the backlight assembly 220, and a mold frame 230 as a second receiving container for supporting and receiving the liquid crystal display panel assembly 210. The mold frame 230 is disposed on the bottom chassis 224.

The bottoms chassis 224 includes a bottom surface and a plurality of sidewalls extended from the edges of the bottom surface. The upper face of the bottoms chassis 224 is opened, so that the bottoms chassis 224 has a hexahedral shape. A receiving space is formed in the bottoms chassis 224. The reflecting plate 223 is disposed in the receiving space along the bottom surface and the sidewalls of the bottoms chassis 224. A plurality of lamps parallel with each other is disposed over the reflecting plate 223. The light-distribution changing means 222 is disposed over the light source 221 to be spaced apart from the light source 221 by a predetermined distance.

The mold frame 230 is installed on the bottom chassis 224. The mold frame 230 has a hexahedron shape having an opening corresponding to that of the bottom chassis 224. The mold frame 230 includes a plurality of sidewalls. An inner space is formed within the sidewalls of the mold frame 230. A stepped portion 224a is formed on the sidewall of the mold frame 230. An upper surface of the stepped portion 224a supports the liquid crystal display panel assembly 210, and a lower surface of the stepped portion 224a makes contact with the protecting sheet 222e, thereby fixing the light-distribution changing means 222. Therefore, the light-distribution changing means 222 is prevented from detached from the bottom chassis 224, and the liquid crystal display panel assembly 210 is disposed over the light-distribution changing means 222 and the mold frame 230 receives the liquid crystal display panel assembly 210. A top chassis 240 may fix the liquid crystal display panel assembly 210 to the mold frame 230.

The light-distribution changing means 222 and the noise shielding sheet 222f are electrically connected to an earth potential through the receiving container, thereby electrically stabilizing the noise shielding sheet 222f. The noise shielding sheet 222f may be directly contacted to the receiving container and indirectly contacted to the receiving container through a conductive connecting means. For example, the conductive connecting means may include a conductive tape. The conductive tape may be more firmly adhered to the receiving container by means of a fixing means. The conductive tape is disposed in a non-effective display region of the liquid crystal display panel 211. The non-effective display region is a region that is not used for displaying an image. As an embodiment, a surface resistance of the transparent conductive layer is less than about 10 k$\Omega$/m$^2$ when the noise shielding sheet 222f is not connected to an earth potential, and the grounding surface resistance of the transparent conductive layer is less than about 50 k$\Omega$/m$^2$ when the noise shielding sheet 222f is connected to an earth potential through the receiving container.

According to the above-described embodiment of the present invention, the noise shielding means includes a transparent conductive layer such as an ITO that is coated on an upper or a lower surface of a transparent film. The noise shielding means is disposed over the diffusing sheet. Therefore, the noise generated from the power voltage signal applied to the light source is shielded and prevented from affecting the liquid crystal display panel. The noise shielding means may be also disposed between the diffusing plate and the diffusing sheet, between the lower prism sheet and the upper prism sheet, or between the upper prism sheet and the protecting sheet.

According to above example, the noise shielding means includes an additional transparent film on which a conductive material is coated so as to shield the noise. However, the light-distribution changing means may also be used as a noise shielding means for shielding the noise when the additional transparent film is not used.

Figure 3:
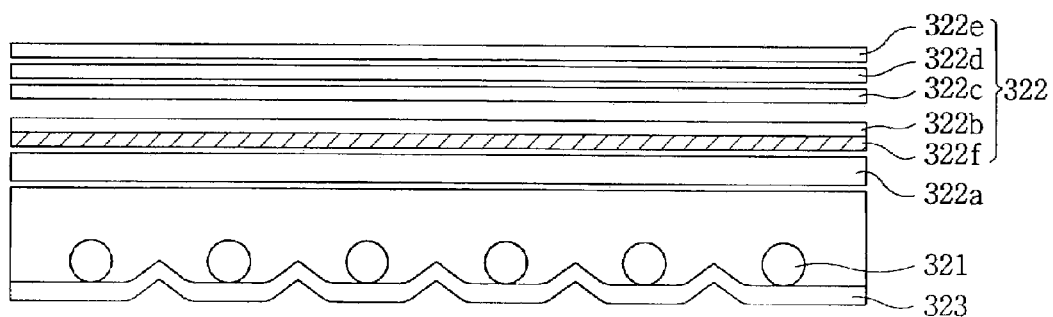
FIG. 3 is a schematic cross-sectional view showing a first modified embodiment of the backlight assembly shown in FIG. 1.

FIG. 3 is a schematic cross-sectional view showing a first modified embodiment of the backlight assembly shown in FIG. 1. The modified backlight assembly of FIG. 3 includes a diffusing sheet, and a conductive material is coated on a rear surface of the diffusing sheet.

Referring to FIG. 3, the first modified backlight assembly 320 includes a light source 321 for generating light, a light-distribution changing means 322 for changing an optical distribution of the light exiting from the light source 321, and a reflecting plate 323 disposed under the light source 321.

The light source 321 includes a plurality of lamps for generating light by an electrical power applied from the external power source. The reflecting plate 323 reflects the light exiting from the light source 321 toward the liquid crystal display panel (not shown).

The light-distribution changing means 322 includes a diffusing plate 322a, a diffusing sheet 322b, a lower prism sheet 322c and an upper prism sheet 322d, a protecting sheet 322e and a noise shielding means 322f. The light-distribution changing means 322 is disposed over the light source 321. The diffusing sheet 322b diffuses the light exiting from the light source 321, and the lower prism sheet 322c and upper prism sheet 322d concentrate the light exiting from the diffusing plate 322a and the diffusing sheet 322b. The protecting sheet 322e protects the prism sheets 322c and 322d, and the noise shielding means 322f shields the noise.

As an embodiment, the diffusing plate 322a has a rigid shape so as to support a variety of optical sheets disposed over the light source 321, and may firstly diffuse the light exiting from the light source 321. The diffusing sheet 322b is disposed over the diffusing plate 322a and secondly diffuses the light exiting from the diffusing plate 322a.

The noise shielding means 322f may include a transparent conductive layer coated or deposited on a rear surface of the diffusing sheet so as to prevent the noise generated from the power voltage signal applied to the light source 321 from affecting the liquid crystal display panel (not shown) disposed above the light source 321. The transparent conductive layer may comprise ITO or IZO, and be coated or deposited on a front surface of the diffusing sheet.

Both a lower prism sheet 322c and an upper prism sheet 322d concentrate the light exiting from the diffusing sheet 322b and enhance the luminance of light incident onto the liquid crystal display panel (not shown) when viewed from the front of the liquid crystal display panel. The light exiting from the diffusing sheet 322b provides a large viewing angle, and the viewing angle of the light may become small after the light passes through the prism sheets 322c and 322d. Therefore, when viewed from the front of the liquid crystal display panel, the luminance of the liquid crystal display panel may be enhanced and power consumption may be reduced. The protecting sheet 322e is disposed over the upper prism sheet 322d and prevents a variety of foreign matter from sticking to the upper prism sheet 322d.

The noise shielding means 322f may be connected to an earth potential through the bottom chassis (not shown). That is, at least one side portion of the diffusing sheet on which the conductive material is coated or deposited is extended to the bottom chassis of the backlight assembly 320 and is connected to the bottom chassis by means of an adhesive member such as a conductive tape, so that the diffusing sheet is connected to an earth potential and the noise shielding means 322f is also connected to an earth potential.

As an embodiment, a surface resistance of the transparent conductive layer is less than about 10 k$\Omega$/m$^2$ when the noise shielding means 322f is not connected to an earth potential, and the grounding surface resistance of the transparent conductive layer is less than about 50 k$\Omega$/m$^2$ when the noise shielding means 322f is connected to an earth potential through the receiving container.

According to the first modified embodiment of the backlight assembly, the noise shielding means includes a conductive material coated or deposited on the rear surface or the front surface of the diffusing sheet, so that the noise generated from the power voltage signal applied to the light source may be prevented from electrically affecting the liquid crystal display panel.

Figure 4:
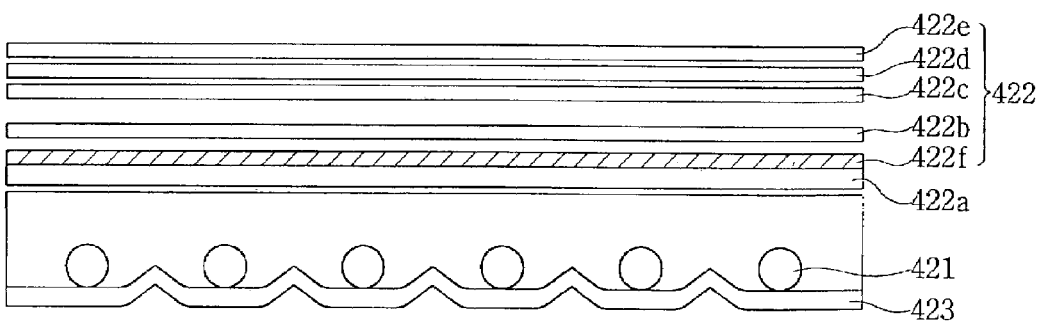
FIG. 4 is a schematic cross-sectional view showing a second modified embodiment of the backlight assembly shown in FIG. 1.

FIG. 4 is a schematic cross-sectional view showing a second modified embodiment of the backlight assembly shown in FIG. 1. The second modified backlight assembly includes a diffusing plate, and a conductive material is coated on a rear (or front) surface of the diffusing plate.

Referring to FIG. 4, the second modified backlight assembly 420 includes a light source 421 for generating light, a light-distribution changing means 422 for changing an optical distribution of the light exiting from the light source 421, and a reflecting plate 423 disposed under the light source 421.

The light source 421 includes a plurality of lamps for generating light by an electrical power applied from the external power source. The reflecting plate 423 reflects the light exiting from the light source 421 toward the liquid crystal display panel (not shown).

The light-distribution changing means 422 includes a diffusing plate 422a and a diffusing sheet 422b for diffusing the light exiting from the light source 421, a lower prism sheet 422c and an upper prism sheet 422d for concentrating the light diffusing from the diffusing sheet 422b, a protecting sheet 422e for protecting the prism sheets, and a noise shielding means 422f for shielding the noise.

The diffusing plate 422a has a rigid shape so as to support a variety of optical sheets disposed over the light source 421, and firstly diffuses the light exiting from the light source 421. The diffusing sheet 422b is disposed over the diffusing plate 422a and secondly diffuses the light exiting from the diffusing plate 422a.

The noise shielding means 422f includes a transparent conductive layer coated or deposited on a rear surface of the diffusing plate 422a and prevents the noise generated from the power voltage signal applied to the light source 421 from affecting the liquid crystal display panel (not shown) disposed over the light source 421. The transparent conductive layer may comprise the ITO or the IZO. The surface resistance of the transparent conductive layer may be less than about 10 k$\Omega$/m$^2$. The transparent conductive layer may also be coated or deposited on a front surface of the diffusing plate 422a.

Both a lower prism sheet 422c and an upper prism sheet 422d concentrate the light exiting from the diffusing sheet 422b and enhance the luminance of light incident onto the liquid crystal display panel (not shown) when viewed from the front of the liquid crystal display panel. The light exiting from the diffusing sheet 422b provides a large viewing angle, and the viewing angle of the light may become small after the light passes through the prism sheets 422c and 422d. Therefore, when viewed from the front of the liquid crystal display panel, the luminance of the liquid crystal display panel may be enhanced and power consumption may be reduced. The protecting sheet 422e is disposed above the upper prism sheet 422d and prevents a variety of foreign matter from sticking to the upper prism sheet 422d. The noise shielding means 422f may be connected to an earth potential through the bottom chassis (not shown). That is, at least one side portion of the diffusing plate on which the conductive material is coated or deposited is extended to the bottom chassis of the backlight assembly 420 and connected to the bottom chassis by means of an adhesive member such as a conductive tape, so that the diffusing plate is connected to an earth potential and the noise shielding means 422f is also connected to an earth potential.

As an embodiment, a surface resistance of the transparent conductive layer is less than about 10 k$\Omega$/m$^2$ when the noise shielding means 422f is not connected to an earth potential, and the grounding surface resistance of the transparent conductive layer is less than about 50 k$\Omega$/m$^2$ when the noise shielding means 422f is connected to an earth potential through the receiving container.

According to the second modified embodiment of the backlight assembly, the noise shielding means includes a conductive material coated or deposited on the rear surface or the front surface of the diffusing plate, so that the noise generated from the power voltage signal applied to the light source may be prevented from affecting the liquid crystal display panel.

Figure 5:
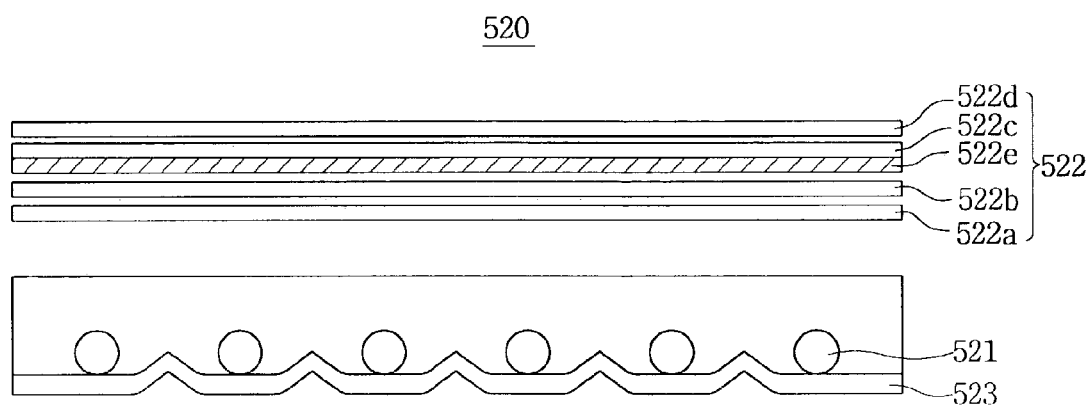
FIG. 5 is a schematic cross-sectional view showing a third modified embodiment of the backlight assembly shown in FIG. 1.
Figure 6:
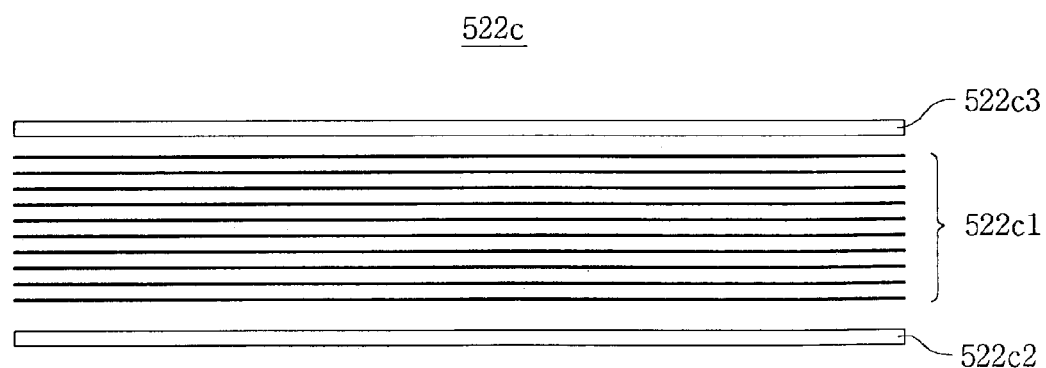
FIG. 6 is a cross sectional view showing an example of a luminance-intensifying sheet shown in FIG. 5.

FIG. 5 is a schematic cross-sectional view showing a third embodiment of the backlight assembly as shown in FIG. 1. The third modified backlight assembly includes a luminance-intensifying sheet, and a conductive material is coated on a rear surface of the luminance-intensifying sheet. FIG. 6 is a cross sectional view showing an example of the luminance-intensifying sheet shown in FIG. 5.

Referring to FIG. 5, the third modified backlight assembly 520 includes a light source 521 for generating light, a light-distribution changing means 522 for changing an optical distribution of the light exiting from the light source 521, and a reflecting plate 523 disposed under the light source 521.

The light source 521 includes a plurality of lamps for generating light by an electrical power applied from the external power source. The reflecting plate 523 reflects the light exiting from the light source 521 toward the liquid crystal display panel (not shown).

The light-distribution changing means 522 includes a diffusing plate 522a and a diffusing sheet 522b for diffusing the light exiting from the light source 521, a luminance-intensifying sheet 522c for intensifying the luminance of the light incident onto the liquid crystal display panel (not shown), a protecting sheet 522d for protecting the luminance-intensifying sheet 522c, and a noise shielding means 522f for shielding the noise. The noise shielding means 522e is disposed on a rear surface of the luminance-intensifying sheet 522c.

The diffusing plate 522a has a rigid shape so as to support a variety of optical sheets disposed over the light source 521, and firstly diffuses the light exiting from the light source 521. The diffusing sheet 522b is disposed over the diffusing plate 522a and secondly diffuses the light exiting from the diffusing plate 522a.

The noise shielding means 522e includes a transparent conductive layer coated or deposited on a rear surface of the luminance-intensifying sheet 522c and prevents the noise generated from the power voltage signal applied to the light source 521 from affecting the liquid crystal display panel (not shown) disposed over the light source 521. The transparent conductive layer may comprise the ITO or the IZO. The transparent conductive layer may also be coated or deposited on a front surface of the luminance-intensifying sheet 522c.

The luminance-intensifying sheet 522c includes a refractive polarized film having an upper polycarbonate 522c3, a lower polycarbonate 522c2 opposite to the upper polycarbonate 522c3, and a plurality of film 522c1 interposed between the upper polycarbonate and the lower polycarbonate. The films 522c1 having different refractive indexes with one another are sequentially stacked. The noise shielding means 522e is coated or deposited on a front surface of the upper polycarbonate 522c3 or on a rear surface of the lower polycarbonate 522c2.

The noise shielding means 522e may be connected to an earth potential through the bottom chassis (not shown). That is, at least one side portion of the luminance-intensifying sheet 522c on which the conductive material is coated or deposited is extended to the bottom chassis of the backlight assembly 420 and is connected to the bottom chassis by means of an adhesive member such as a conductive tape, so that the luminance-intensifying sheet 522c is connected to an earth potential and the noise shielding means 522e is also connected to an earth potential.

As an embodiment, a surface resistance of the transparent conductive layer is less than about 10 k$\Omega$/m$^2$ when the noise shielding means 522e is not connected to an earth potential, and the grounding surface resistance of the transparent conductive layer is less than about 50 k$\Omega$/m$^2$ when the noise shielding means 522e is connected to an earth potential through the receiving container.

According to the third backlight assembly of the present invention, the noise shielding means includes a transparent conductive layer deposited or coated on the rear surface of the lower polycarbonate. However, the noise shielding means may includes a transparent conductive layer deposited or coated on the front surface of the upper polycarbonate. In addition, the noise shielding means may include a transparent film additionally disposed under the luminance-intensifying sheet 522c. A transparent conductive layer is deposited on a front surface of the transparent film. The noise shielding means is positioned close to the liquid crystal display panel as much as possible, so that the noise generated from the power voltage signal applied to the light source may be prevented from affecting the liquid crystal display panel, and a luminance may decrease or a color shift in the liquid crystal display panel may be minimized.

Figure 7:
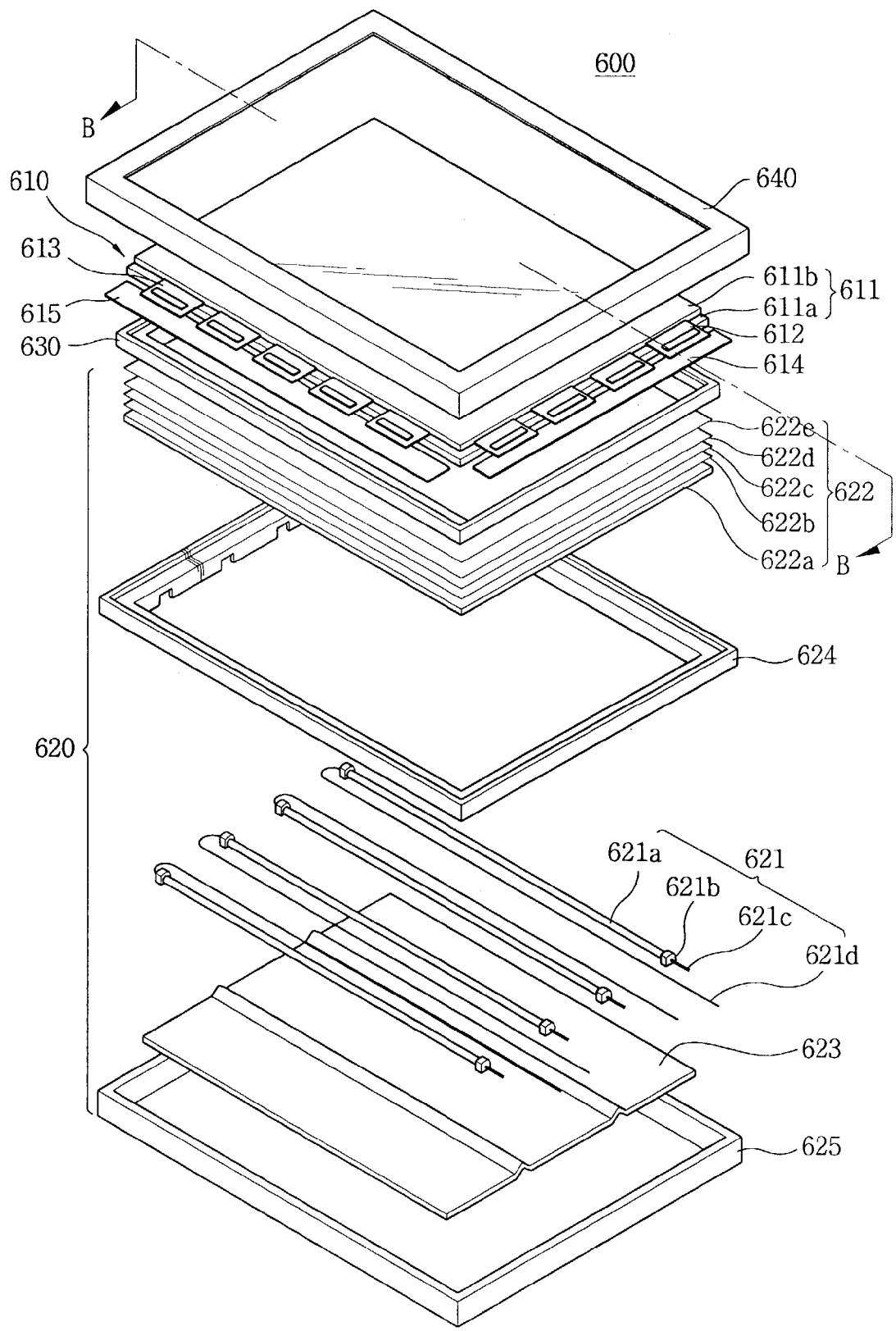
FIG. 7 is an exploded perspective view showing an LCD device including a noise shielding means according to another embodiment of the present invention.
Figure 8:
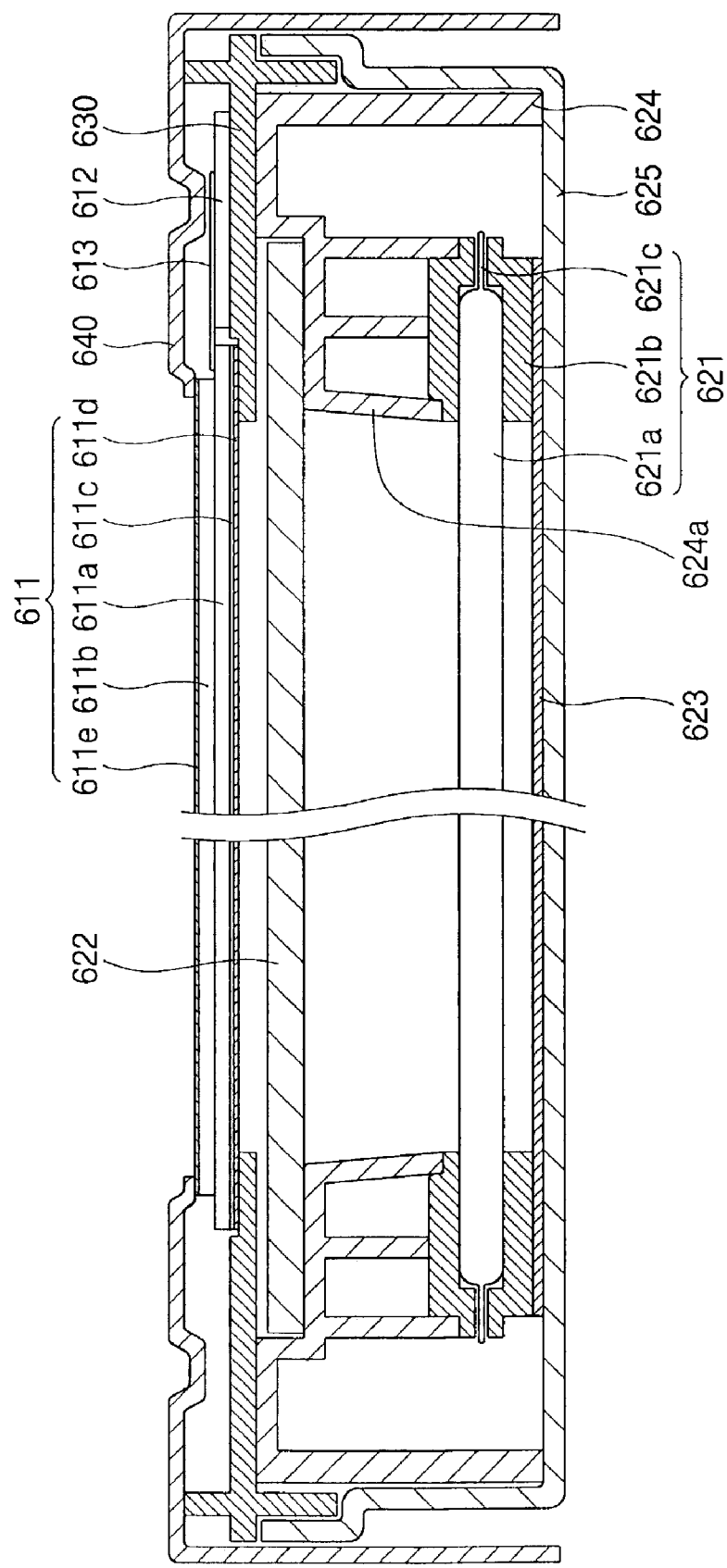
FIG. 8 is a cross sectional view taken along the line B—B of the LCD device shown in FIG. 7.

FIG. 7 is an exploded perspective view showing an LCD device including a noise shielding means according to another embodiment of the present invention, and FIG. 8 is a cross sectional view taken along the line B—B of the LCD device shown in FIG. 7.

Referring to FIG. 7 and FIG. 8, an LCD device 600 according to another embodiment of the present invention includes a liquid crystal display panel assembly 610 for displaying an image, a backlight assembly 620 for providing the liquid crystal display panel assembly 610 with light, and a receiving container for receiving the liquid crystal display panel assembly 610 and the backlight assembly 620.

The liquid crystal display panel assembly 610 includes a liquid crystal display panel 611 for displaying an image according to an image signal, a data printed circuit board (PCB) 615, a gate PCB 614, a data tape carrier package (TCP) 613 and a gate tape carrier package (TCP) 612. The liquid crystal display panel 611 includes a TFT substrate 611a on which a plurality of TFTs is arranged, a color filter substrate 611b opposite to the TFT substrate 611a, a liquid crystal layer (not shown) interposed between the TFT substrate 611a and the color filter substrate 611b, a noise shielding means 611c for shielding noise, and first and second polarizing plates 611d and 611e for enhancing luminance.

The noise shielding means 611c is disposed under the TFT substrate 611a and prevents the noise generated from the power voltage signal applied to the backlight assembly 620 from affecting the liquid crystal display panel assembly 610. The first polarizing plate 611d is installed under the noise shielding means 611c and enhances the luminance of the light that is incident onto the TFT substrate 611a. A second polarizing plate 611e is installed over the color filter substrate 611b and enhances the luminance of the light exiting from the color filter substrate 611b. The noise shielding means 611c may include conductive particles scattered into the first polarizing plate 611d, so that the noise shielding means may be formed in a body with the first polarizing plate 611d.

Figure 9:
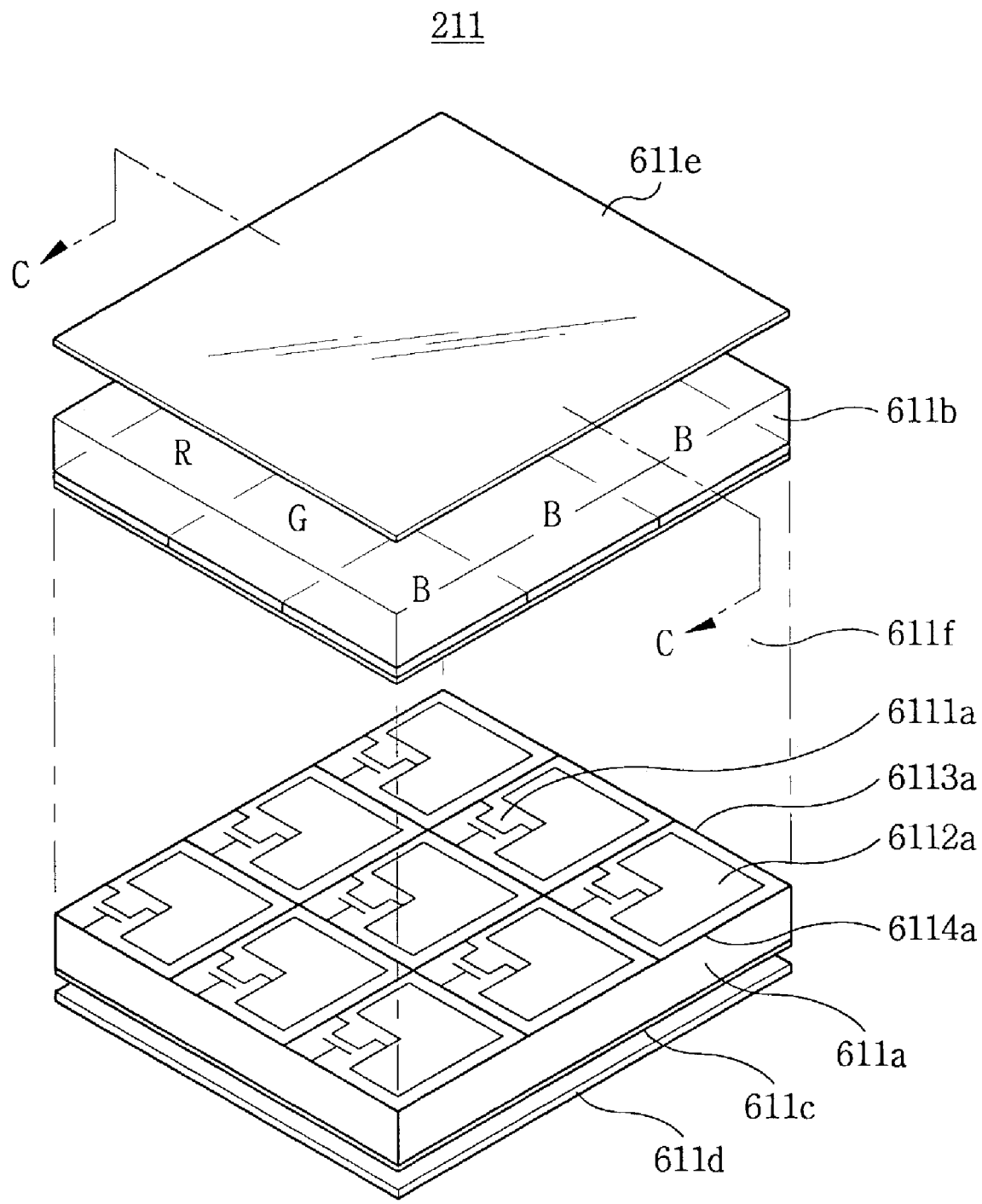
FIG. 9 is a perspective view schematically showing the LCD panel shown in FIG. 7.
Figure 10:
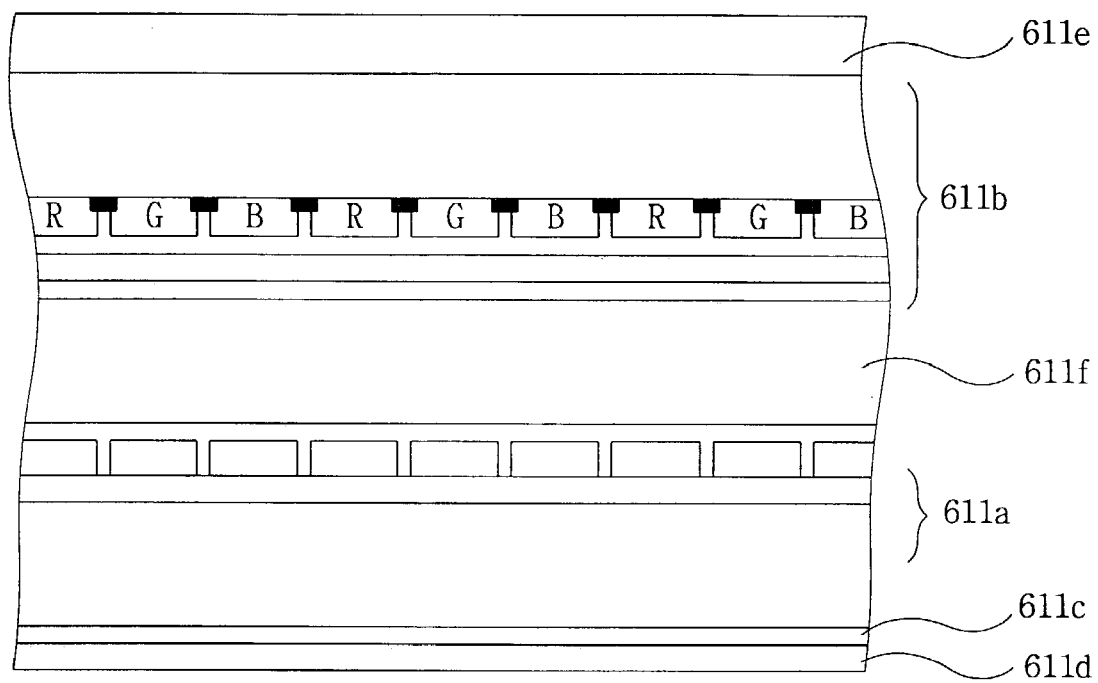
FIG. 10 is a cross sectional view taken along the line C—C of the liquid crystal display panel shown in FIG. 9.

FIG. 9 is a perspective view schematically showing the liquid crystal display panel shown in FIG. 7, and FIG. 10 is a cross sectional view taken along the line C—C of the liquid crystal display panel shown in FIG. 9.

Referring to FIG. 9, the liquid crystal display panel 611 is a transmissive type liquid crystal display panel. The liquid crystal display panel 611 includes a TFT substrate 611a on which a plurality of TFTs is arranged, a color filter substrate 611b facing the TFT substrate 611a spaced apart by a predetermined distance, for example about 5 $\mu$m, from the color filter substrate 611b, and a liquid crystal layer 611f interposed between the color filter substrate 611b and the TFT substrate 611a. The liquid crystal display panel 611 also includes a noise shielding means 611c for shielding the noise generated from the power voltage signal applied to the backlight assembly, a lower polarizing plate 611d disposed under the noise shielding means 611c, and an upper polarizing plate 611e disposed over the color filter substrate 611b. The noise shielding means is disposed under the TFT substrate 611a.

As an embodiment, the noise shielding means 611c may include a transparent conductive layer coated on the rear surface of the TFT substrate 611a. For example, the transparent conductive layer may be a thin film comprised of ITO or a thin film comprised of IZO. The noise shielding means 611c has a light transmissivity equal to or more than about 85% and a surface resistance less than about 10$\Omega$/m$^2$. The electrical effect of the electromagnetic waves generated from the high power voltage applied to the backlight assembly may be canceled by the noise shielding means 611c having the surface resistance. In case the transparent conductive layer may be not formed as the noise shielding means 611c under the TFT substrate 611a, the noise shielding means 611c may include conductive particles scattered into the first polarizing plate 611d, to thereby be formed in a body with the first polarizing plate 611d.

As another embodiment, the noise shielding means 611c may include a conductive polymer sheet disposed under the TFT substrate 611a. The conductive polymer sheet may comprise polyaniline, polycarbazole, polyphenylene, polypyrrole, or polythiopene.

As shown in FIG. 9 and FIG. 10, a plurality of transparent pixel electrodes 6112a is arranged in a matrix shape on the TFT substrate 611a. A gate line 6113a to which a scanning signal is applied and a data line 6114a to which a image data signal is applied cross each other around the transparent pixel electrode 6112a. The scanning signal and the image data signal are inputted from an external terminal (not shown) of an external circuit such as gate driver circuit and data driver circuit, respectively.

Each of the TFTs 6111a includes a source electrode, a gate electrode and a drain electrode and is disposed adjacent to an intersection between the gate line 6113a and the data line 6114a. The respective TFT 6111a is used as a switching device and applies a signal voltage to the liquid crystal layer 611f through the drain electrode connected to the transparent pixel electrode 6112a. That is, the TFT 6111a is turned on in response to the scanning signal applied to the gate electrode connected to the gate line 6113a. A data signal that is applied to the source electrode connected to the data line 6114a is is transmitted to the transparent pixel electrode 6112a through the drain electrode.

According to the above description, for example, the noise shielding means may be employed in the transmissive type liquid crystal display panel. However, the noise shielding means may be also employed in a reflective and transmissive type liquid crystal display panel.

In the transmissive type liquid crystal display panel, each pixel functions as a transmissive region for receiving the light supplied from a backlight. In the reflective and transmissive type liquid crystal display panel, each pixel is divided into a reflective region and a transmissive region. The reflection region reflects a natural light, and the transmissive region transmits the light supplied from the backlight.

According to the above description, the noise shielding means is disposed on the rear surface of the TFT substrate and covers the entire rear surface of the TFT substrate. However, the noise shielding means may not cover the entire rear surface of the TFT substrate. The electrodes of the lamp of the backlight assembly are generally divided into a hot electrode and a clod electrode according to the voltage level of the power voltage applied to the electrode of the lamp. A relatively high voltage is applied to the hot electrode of the lamp, and a relatively low voltage is applied to the cold electrode of the lamp. Accordingly, the intensity of the noise generated from the power voltage signal is much stronger around the hot electrode than around the cold electrode. For this reason, the noise shielding means may cover a portion of the rear surface of the TFT substrate instead of the entire rear surface of the TFT substrate, especially the portion of the rear surface corresponding to the hot electrode of the lamp. For the same reason, the thickness of the noise shielding means formed on the entire rear surface of the TFT substrate may be non-uniform. For example, the nearer the noise shielding means is from the hot electrode, the thicker is the thickness of the noise shielding means.

The backlight assembly 620 includes a light source 621 for generating light, a light-distribution changing means 622 for changing an optical distribution of the light exiting from the light source 621, a reflecting plate 623 for reflecting the light exiting from the light source toward the liquid crystal display panel assembly 610, a mold frame 624 and a bottom chassis 625.

The light source 621 includes a plurality of lamps 621a for generating light, lamp holders 621b disposed at first and second ends of the lamp 621a, a first power line 621c drawn out from the first end of the lamp 621a, and a second power line 621d drawn out from the second end of the lamp 621a. An electrical power having a predetermined voltage level is applied to the lamp 621a through the first and second power lines 621c and 621d, so that light is emitted from the lamp 621a. An electromagnetic noise is radiated in all directions due to the high voltage applied to the lamp 621a. A structure and function of the first and second power lines 621c and 621d are identical to the structure and function of the first and second power lines 221c and 221d shown in FIG. 1. Therefore, the description of the first and second power lines 621c and 621d is omitted.

The light-distribution changing means 622 includes a diffusing plate 622a and diffusing sheet 622b for diffusing the light exiting from the light source 621, a lower prism sheet 622c and an upper prism sheet 622d for concentrating the light exiting from the diffusing sheet 622b, and a protecting sheet 622e for protecting the lower and upper prism sheets 622c and 622d. The light-distribution changing means 622 is disposed over the light source 221.

The diffusing plate 622a has a rigid shape so as to support a variety of optical sheets disposed over the light source 621, and firstly diffuses the light exiting from the light source 621. The diffusing sheet 622b is disposed over the diffusing plate 622a and secondly diffuses the light exiting from the diffusing plate 622a.

The lower prism sheet 622c and the upper prism sheet 622d can concentrate the light exiting from the diffusing sheet 622b and enhance the luminance of light that is incident onto the liquid crystal display panel 611 when viewed from the front of the liquid crystal display panel 611. The light exiting from the diffusing sheet 622b provides a large viewing angle, and the viewing angle of the light may become small after the light passes through the prism sheets 622c and 622d. Therefore, the luminance of light may be enhanced and power consumption may be reduced. The protecting sheet 622e is disposed over the upper prism sheet 622d for preventing a variety of foreign matters from sticking to the upper prism sheet 622d.

The receiving container includes a first receiving container for receiving the backlight assembly 620, and a second receiving container for receiving the liquid crystal display panel assembly 610. The second receiving container is disposed on the first receiving container.

The first receiving container includes a mold frame 624 for supporting the light-distribution changing means, and a bottom chassis 625 for receiving the mold frame 624, the light source 621 and the reflecting plate 623.

The mold frame 230 has a hexahedron shape having an opening corresponding to that of the bottom chassis 224. The mold frame 230 includes a plurality of sidewalls.

The mold frame 624 has an hexahedron shape having the opening corresponding to that of the bottom chassis 224. The mold frame 624 includes a plurality of sidewalls and top and bottom faces. A stepped portion 624a is formed on the sidewalls of the mold frame 624 and is extended toward the inner space of the mold frame 624. An upper surface of the stepped portion 624a supports the light-distribution changing means 622, and the light source 621 and the reflecting plate 623 is supported by the stepped portion 624a and is received in the inner space of the mold frame 624.

The bottom chassis 625 comprises, for example, conductive metal. The bottom chassis 625 includes a bottom surface and a plurality of sidewalls extended from edges of the bottom surface and have a hexahedral shape that does not have a top surface. Therefore, the bottom chassis 625 has a bottom surface and a plurality of sidewalls to provide a receiving space. The mold frame 624 including the light source 621, reflecting plate 623 and light-distribution changing means 622 is received in the receiving space of the bottom chassis 625.

As an embodiment, a middle chassis 630 or the second receiving container is installed on the mold frame 624. The middle chassis 630 has hexahedron shape having the opening corresponding to that of the mold frame 624. The middle chassis 630 includes a plurality of sidewalls and a stepped portion to provide an inner space. The stepped portion is formed on the sidewalls of the middle chassis 630 and is extended toward the inner space of the middle chassis 630. The liquid crystal display panel assembly 610 is supported by an upper surface of the stepped portion, and the light-distribution changing means 622 makes contact with the lower surface of the stepped portion, to thereby be fixed to the mold frame 624. Therefore, the light-distribution changing means 622 is prevented from detached from the bottom chassis 625, and the liquid crystal display panel assembly 610 is mounted on the middle chassis 630 to be positioned over the light-distribution changing means 622. A top chassis 640 comprises, for example, conductive metal, and is coupled with outer surface of the sidewalls of the bottom chassis 625, to thereby fix the liquid crystal display panel assembly 610 to the middle chassis 630.

According to the present embodiment, the noise shielding means is employed in the direct illumination type LCD device in which a plurality of lamps is disposed under the liquid crystal display panel. However, the noise shielding means may be employed in the edge-illumination type LCD device including a light guiding plate.

The noise shielding means absorbs the electromagnetic noise generated from the power signal applied to the lamp, and thus electrons may be accumulated on the noise shielding means. The light-distribution changing means may also absorb the noise, and the electrons may be also accumulated on the light-distribution changing means. The electrons accumulated on the noise shielding means and the light-distribution changing means may be discharged through an additional ground member, thereby electrically stabilizing the noise shielding means and the light-distribution changing means. Hereinafter, various ground members will be described. The noise shielding means and/or the light-distribution changing means may make directly contact with the receiving container so that the accumulated electrons may be discharged.

Figure 11:
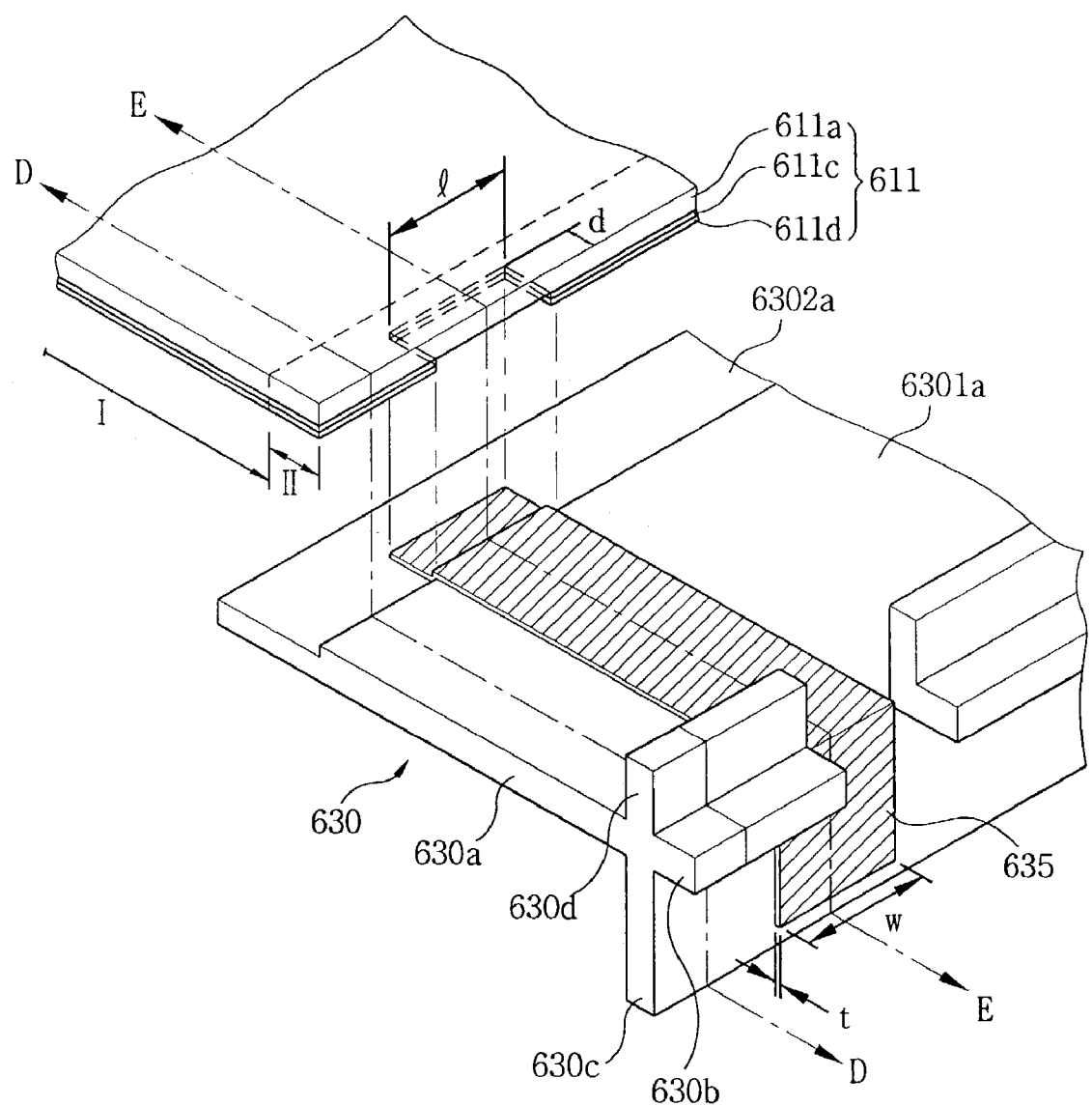
FIG. 11 is an exploded perspective view showing an assembly structure of the liquid crystal display panel and the middle chassis of the LCD device shown in FIG. 7.

FIG. 11 is an exploded perspective view showing an assembly structure of the liquid crystal display panel and the middle chassis in the LCD device shown in FIG. 7. In FIG. 11, a conductive tape is illustrated as an example of the ground member.

Referring to FIG. 11, the middle chassis 630 includes a first body 630a extended in a first direction, a second body 630b extended in a second direction opposite to the first direction, a first sidewall 630c extended from a portion between the first and second bodies 630a and 630b and inserted into the space between the mold frame 624 and the bottom chassis 625, and a second sidewall 630d extended in opposition to the first sidewall 630c. The first body 630a supports the liquid crystal display panel 611. The second sidewall 630d supports the top chassis 640. The first body 630a includes a first upper surface 6301a and a second upper surface 6302a. The second upper surface 6302a and the first upper surface 6301a form a stepped portion.

The ground member for discharging the electrons accumulated on the noise shielding means is disposed on a portion of the first body 630a. That is, the conductive tape having a predetermined thickness 't' and a predetermined width 'w' is disposed across the first upper surface 6301a and the second upper surface 6302a. A portion of the second sidewall 630d and a portion of the second body 630b are cut off by the width corresponding to the width of the conductive tape, to thereby form a first opening portion. The conductive tape 635 is extended to the first opening portion, and then bent to be extended along the first sidewall 630c.

A peripheral portion of the noise shielding means 611c and a peripheral portion of the first polarizing plate 611d disposed under the noise shielding means 611c are partially removed, so that a second opening portion is formed on the peripheral portions of the noise shielding means 611c and the first polarizing plate 611d. The second opening potion has a length 'l' and a predetermined depth d. The length 'l' corresponds to the width w of the conductive tape 635. Accordingly, when the liquid crystal display panel 611 is disposed on the middle chassis 630, the conductive tape 635 is inserted into the second opening portion. The cross-sectional faces of the noise shielding means 611c and the first polarizing plate 611d makes contact with the side surfaces of the conductive tape 635, so that the electrons accumulated on the noise shielding means 611c may be discharged to the conductive tape 635.

The TFT substrate 611a is divided into an effective region I and a non-effective region II. The light provided from the backlight assembly transmits the effective region and an image is displayed on the effective region. The effective region 'I' is disposed in a central portion of the TFT substrate 611a. The light provided from the backlight assembly may not transmit the non-effective region and an image may not be displayed on the non-effective region. The non-effective region 'II' surrounds the effective region. As an embodiment, the effective region 'I' has a first width $W_I$ and the non-effective region 'I' has a second width $W_{II}$. The second opening has the depth 'd' is less than the second width $W_{II}$ of the non-effective region 'II', and the first width $W_I$ of the effective region 'I' is not reduced due to the conductive tape 635.

The electrons accumulated on the noise shielding means 611c move to the conductive tape 635, and then are discharged to the bottom chassis 625 via the middle chassis 630 comprised of a metal meterial. Therefore, the electrons are prevented from being accumulated on the noise shielding means 611c, and the noise shielding means 611c is electrically stabilized.

According to the above embodiment, the peripheral portions of both the first polarizing plate 611d and the noise shielding means 611c are partially removed so as to electrically connect the noise shielding means 611c and the conductive tape 635. However, the peripheral portions of the noise shielding means 611c may be not removed, but only the peripheral portions of the first polarizing plate 611d may be removed so as to discharge the electrons accumulated on the noise shielding means 611c. When the peripheral portions of the first polarizing plate 611d is removed, the rear surface of the noise shielding means 611c is partially exposed, so that the exposed rear surface of the noise shielding means 611c and the upper surface of the conductive tape 635 make contact with each other and the electrons accumulated on the noise shielding means 611c may be discharged to the conductive tape 635.

Figure 12A:
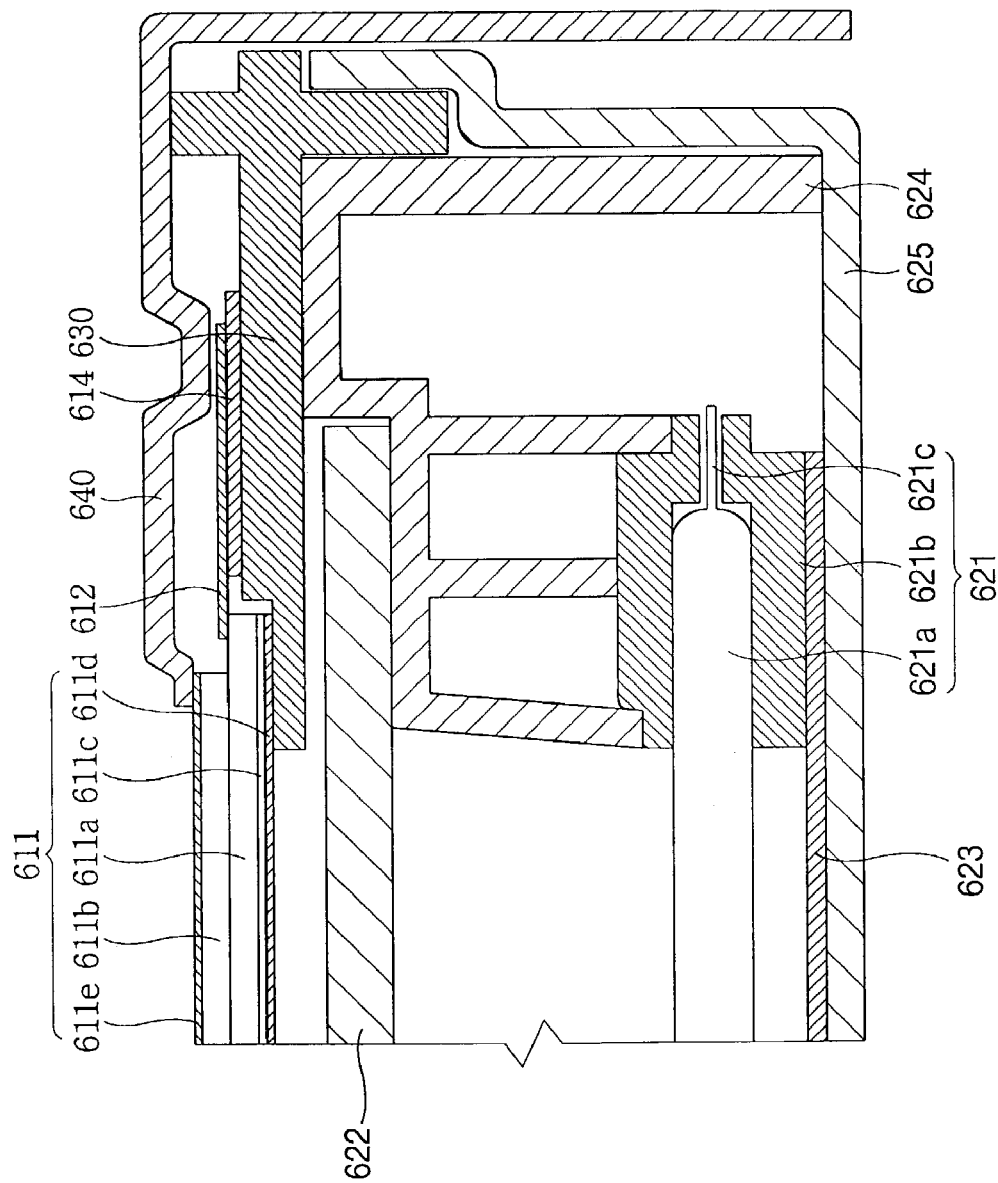
FIG. 12A is a cross sectional view taken along the line D—D of the assembly structure of the liquid crystal display panel and the middle chassis shown in FIG. 11.
Figure 12B:
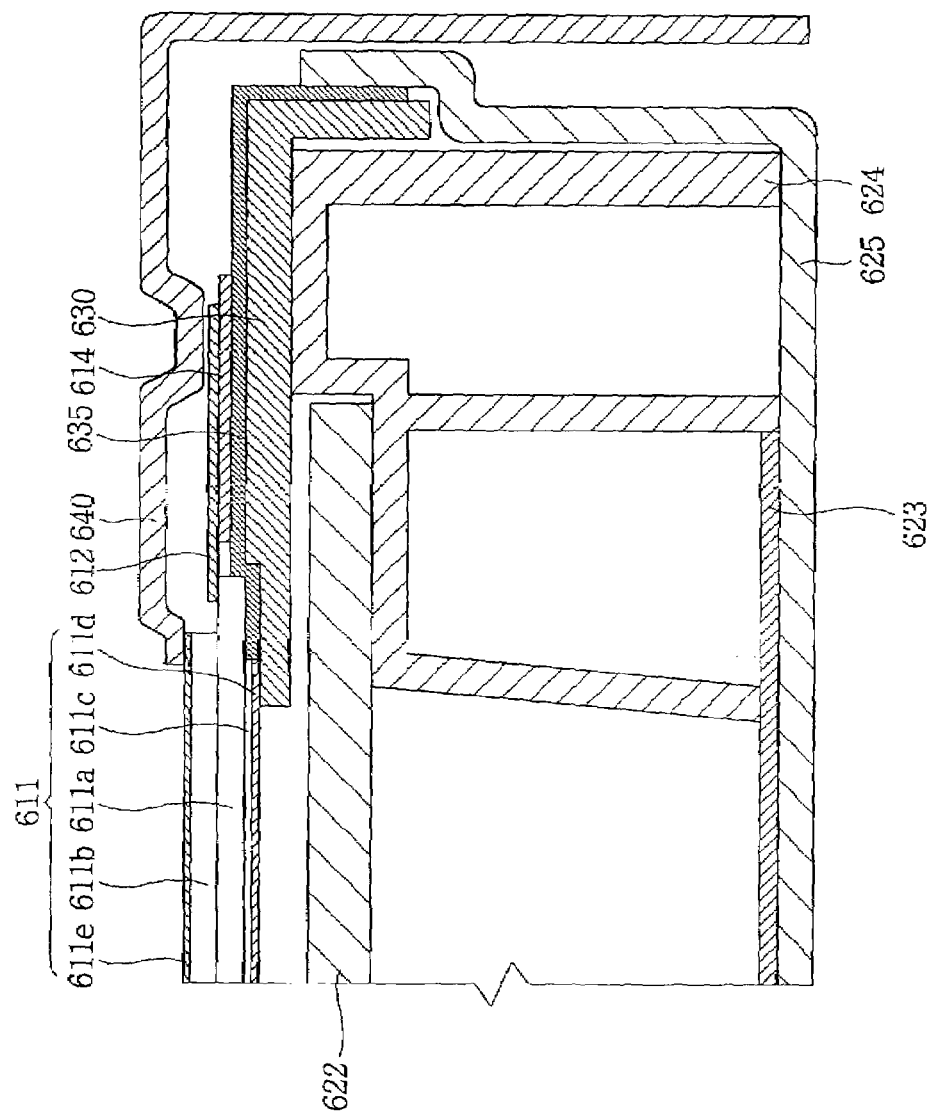
FIG. 12B is a cross sectional view taken along the line E—E of the assembly structure of the liquid crystal display panel and the middle chassis shown in FIG. 11.
Figure 13:
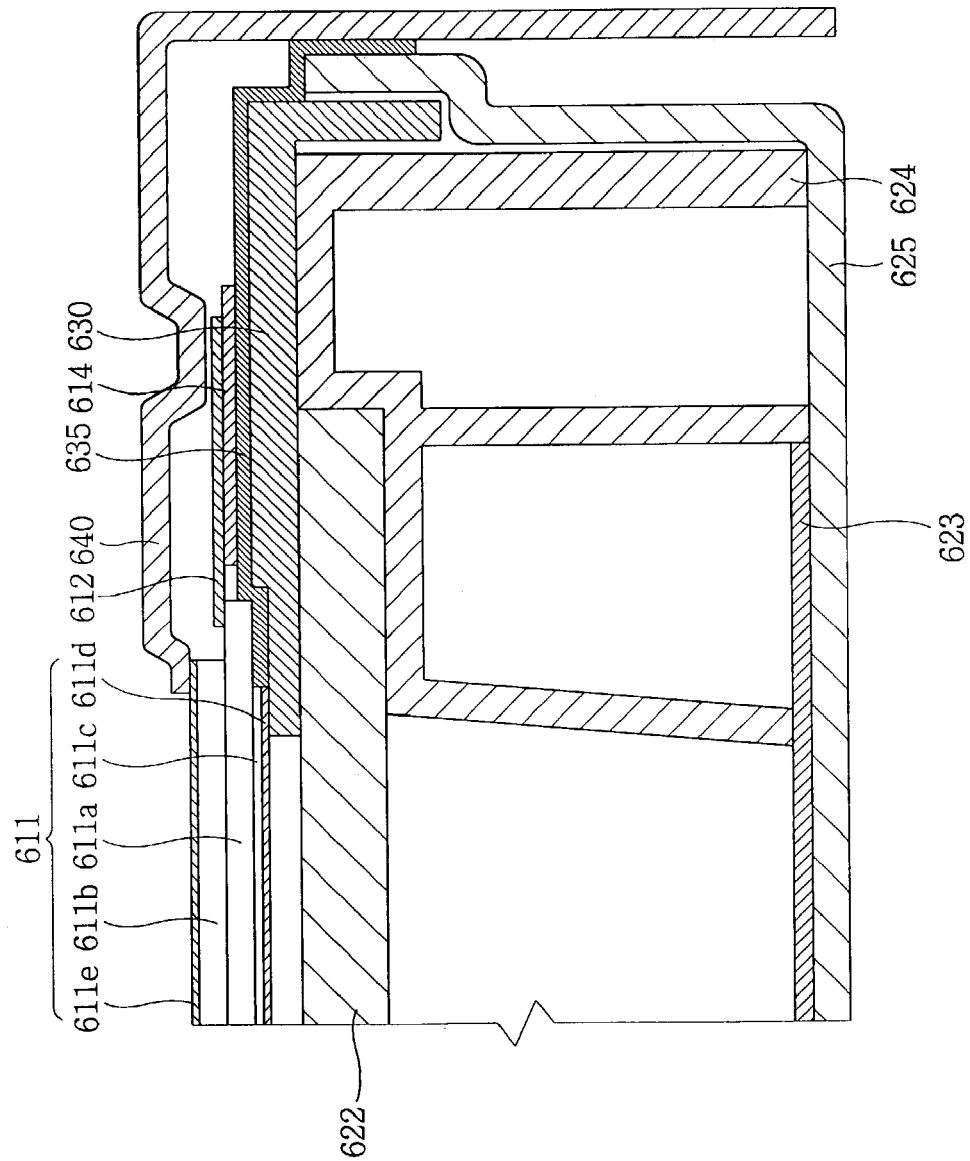
FIG. 13 is a cross sectional view showing an LCD device including a conductive tape for connecting the noise shielding means to the earth potential.

FIG. 12A is a cross sectional view taken along the line D—D of an LCD device including the middle chassis and the liquid crystal display panel shown in FIG. 11, and FIG. 12B is cross sectional view taken along the line E—E of an LCD device including the middle chassis and the liquid crystal display panel shown in FIG. 11. FIG. 13 is a cross sectional view showing an LCD device including a conductive tape for connecting the noise shielding means to the earth potential.

As shown in FIG. 12A, the noise shielding means 611c and the first polarizing plate 611d make contact with the second upper surface 6302a of the middle chassis 630 and is supported by the second upper surface 6302a of the middle chassis 630. Therefore, the noise shielding means 611c and the conductive tape 635 is not connected with each other at the portion of the middle chassis 630 on which the conductive tape 635 is not adhered to. However, as shown in FIG. 12B, the cross sectional surfaces of the noise shielding means 611c and the conductive tape 635 make contact with each other at the potion of the middle chassis 630 to which the conductive tape is adhered. Therefore, the electrons accumulated on the noise shielding means 611c are discharged to the bottom chassis 625 via the conductive tape 635.

The conductive tape 635 may be bend down and be extended along the bottom chassis 625 via the second opening portion of the middle chassis 630 as shown in FIG. 13. The electrons accumulated on the noise shielding means 611c are directly discharged to the bottom chassis 625 via the conductive tape 635.

The conductive tape 635 may be adhered to the upper surface of the mold frame 624 when the middle chassis 630 is not installed in the LCD device. Further, the conductive tape 635 is more firmly adhered to the mold frame 624 by using an additional fixing means. For example, the fixing means may be a fixing clip or a fixing screw.

Figure 14:
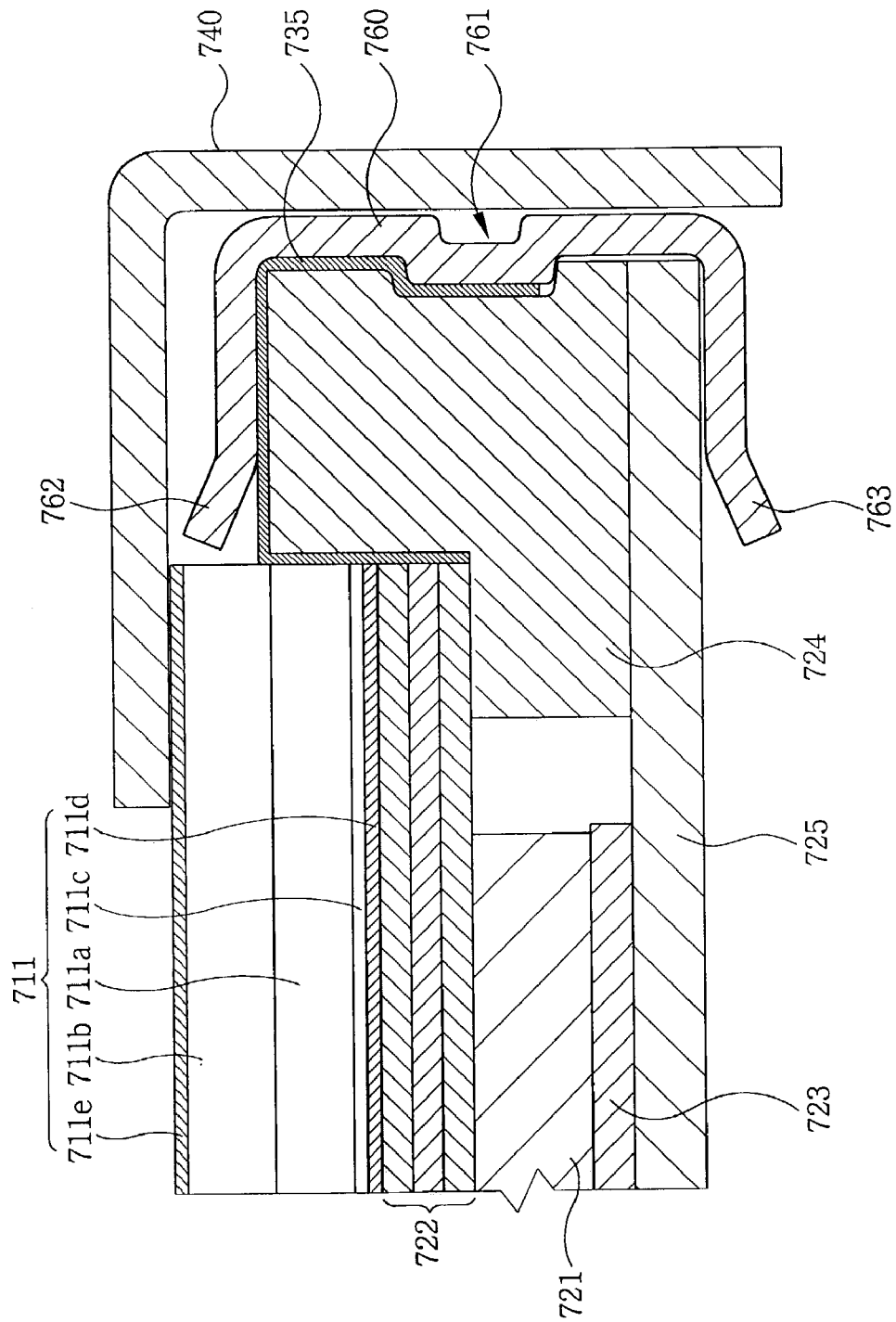
FIG. 14 is a cross sectional view showing a portion of an LCD device including a conductive clip as an example of a ground member.
Figure 15:
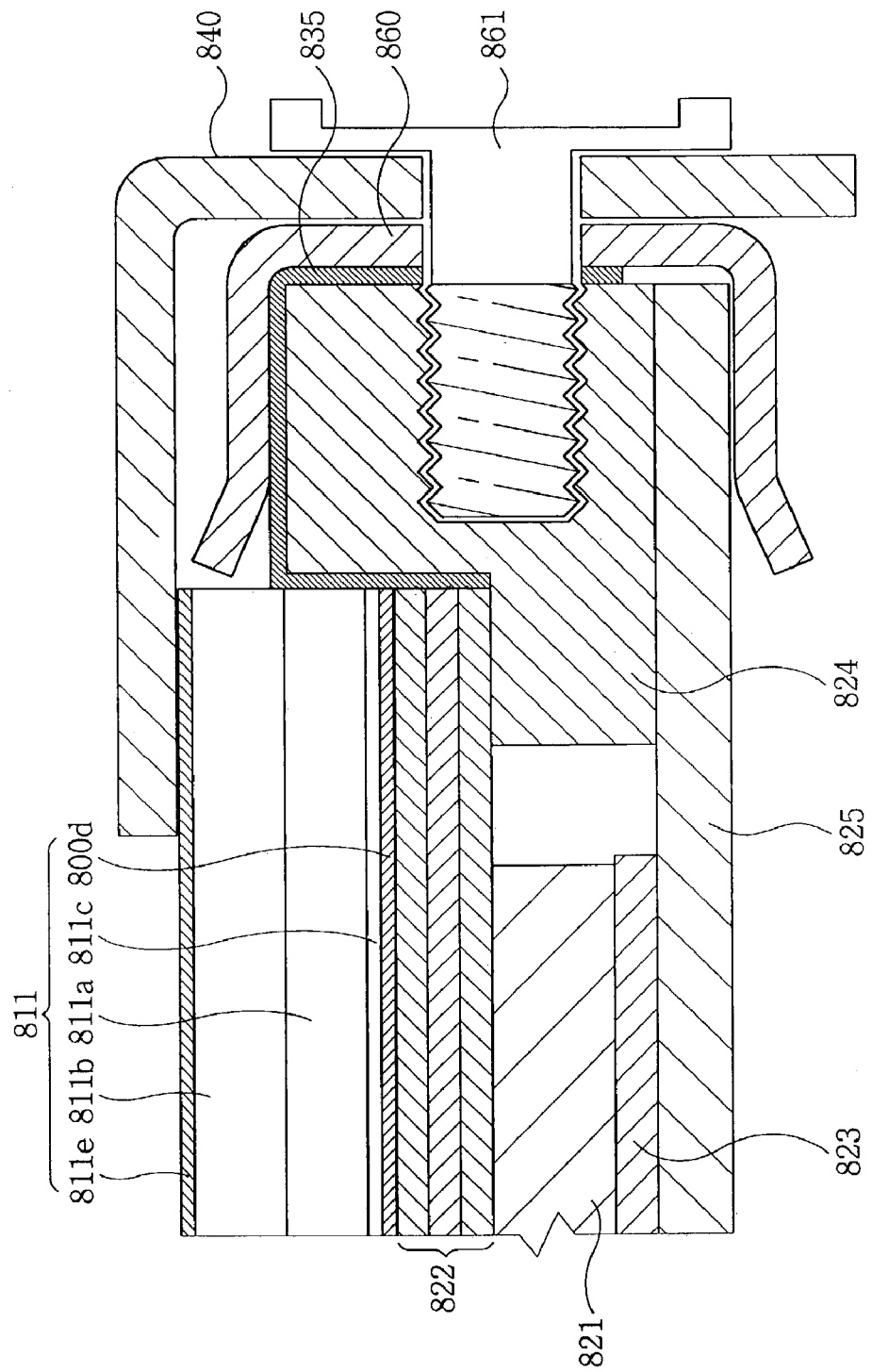
FIG. 15 is a cross sectional view showing an LCD including a conductive clip and a conductive screw.

FIG. 14 is a cross sectional view showing a portion of an LCD device including a conductive clip as an example of a ground member, and FIG. 15 is a cross sectional view showing an LCD including a conductive clip and a conductive screw. Referring to FIG. 14, a mold frame 724 has a plurality of sidewalls and provides a receiving space. The receiving space receives a reflecting plate 723, a light source 721, a light-distribution changing means 722 and a liquid crystal display panel 711 in the named order. The light source 721 generates light, and the reflecting plate 723 reflects the light exiting from the light source 721 toward the liquid crystal display panel 711. The light-distribution changing means 722 changes the optical distribution of the light exiting from the light source 721. The liquid crystal display panel displays an image by using the light provided from the light source 721.

The light-distribution changing means 722 includes a diffusing plate and a plurality of optical sheets disposed on the diffusing plate. The optical sheets may include a diffusing sheet, a plurality of prism sheet and a protecting sheet. Furthermore, the liquid crystal display panel 711 includes a TFT substrate 711a, a color filter substrate 711b, a liquid crystal layer (not shown) interposed between the TFT substrate 711a and the color filter substrate 711b, a noise shielding sheet 711c disposed under the rear surface of the TFT substrate 711a, a first polarizing plate 711d disposed under the noise shielding sheet 711c, and a second polarizing plate 711e disposed above the color filter substrate 711b.

The noise shielding sheet 711c shields the noise generated from the power voltage signal applied to the light source 721, so that an electrical interference on the liquid crystal display panel 711 is prevented. The electrons accumulated on the noise shielding sheet 711c are discharged through an additional ground member, so that the noise shielding sheet 711c is electrically stabilized.

As an embodiment, the ground member may include a conductive tape 735. The conductive tape 735 is adhered to the upper surface of the mold frame 724 by an adhesive strength between the conductive tape 735 and the upper surface of the mold frame 724. The conductive tape 735 make contact with the side surface of the noise shielding sheet 711c. The conductive tape 735 may also make contact with the light-distribution changing means 722, so that the light-distribution changing means 722 is also connected to earth potential.

In addition, a conductive clip 760 is installed on the mold frame 724 so as to reinforce the adhesion strength of the conductive tape 735. The conductive clip 760 includes a first wing 760a making contact with the upper surface of the mold frame 724 and a second wing 760b making contact with the lower surface of the mold frame 724. The conductive clip 760 may comprise conductive material having superior elastic property. The conductive clip 760 may have superior restoring force.

The first and second wings 760a and 760b provide a restoring force and are attached to the upper and lower surfaces of the mold frame 724, respectively. Accordingly, the conductive tape 735 is stably coupled to the upper surface and side surfaces of the mold frame 724. Further, the mold frame 724 has a groove disposed on the outer sidewall of the mold frame 724. The groove of the mold frame 724 has a predetermined depth and receives the protrusion 761 of the conductive clip 760. The conductive tape 735 is disposed between the mold frame 724 and the protrusion 761 of the conductive clip 760 in the groove and is pressed by the mold frame 724 and the protrusion 761 of the conductive clip 760. Therefore, the conductive tape 735 is more strongly adhered to the mold frame 724 by the frictional force between the mold frame 724 and the conductive tape 735 and between the conductive clip 763 and the conductive tape 735.

Then, a top chassis 740 comprised of conductive metal is combined to the mold frame 724, and the inner side surfaces of the top chassis 740 make contact with the conductive clip 760. Accordingly, the conductive tape 735 is electrically connected to the top chassis 740 by means of the conductive clip 760. Therefore, the electrons accumulated on the noise shielding sheet 711c may be discharged to the top chassis 740 as well as the mold frame 724 and the bottom chassis 725 through the conductive tape 735.

Referring to FIG. 15, a mold frame 825 has a plurality of sidewalls and provides a receiving space. The receiving space receives a reflecting plate 823, a light source 821, a light-distribution changing means 822, and a liquid crystal display panel 811 in the named order. The light source 821 generates light, and the reflecting plate 823 reflects the light exiting from the light source 821 toward the liquid crystal display panel 811. The light-distribution changing means 822 changes the optical distribution of the light exiting from the light source 821. The liquid crystal display panel displays an image by using the light provided from the light source 821.

The light-distribution changing means 822 includes a diffusing plate and a plurality of optical sheets disposed on the diffusing plate. The optical sheets include a diffusing sheet, a plurality of prism sheets and a protecting sheet. Furthermore, the liquid crystal display panel 811 includes a TFT substrate 811$a$, a color filter substrate 811$b$, a liquid crystal layer (not shown) interposed between the TFT substrate 811$a$ and the color filter substrate 811$b$, a noise shielding sheet 811$c$ disposed on the rear surface of the TFT substrate 811$a$, a first polarizing plate 811$d$ disposed under the noise shielding sheet 811$c$, and a second polarizing plate 811$e$ disposed on the color filter substrate 811$b$.

The noise shielding sheet 811$c$ shields the noise generated from the power voltage signal applied to the light source 821, so that an electrical interference on the liquid crystal display panel 811 is prevented. The electrons accumulated on the noise shielding sheet 811$c$ are discharged through an additional ground member, so that the noise shielding sheet 811$c$ is electrically stabilized.

For example, the ground member includes a conductive tape 835. The conductive tape 835 is adhered to the upper surface of the mold frame 824 by the adhesive strength between the conductive tape 835 and the upper surface of the mold frame 824. The conductive tape 835 make contact with the side surface of the noise shielding sheet 811$c$. The conductive tape 835 may also make contact with the light-distribution changing means 822, so that the light-distribution changing means 822 is also connected to earth potential.

In addition, a conductive clip 860 is installed in the mold frame 825 so as to reinforce the adhesion strength of the conductive tape 835. The conductive clip 860 includes a first wing 860$a$ making contact with the upper surface of the mold frame 825 and a second wing 860$b$ making contact with the lower surface of the mold frame 825. The first and the second wing 860$a$ and 860$b$ provide a restoring force and are attached to the upper and lower surfaces of the mold frame 824, respectively. Accordingly, a conductive tape 835 is stably coupled to the upper surface and side surfaces of the mold frame 825.

Then, the top chassis 840 comprised of conductive metal is coupled to the mold frame 825, and the inner side surfaces of the top chassis 840 make contact with the conductive clip 860. The conductive tape 835 is electrically connected to the top chassis 840 by means of the conductive clip 860. Therefore, the electrons accumulated on the noise shielding sheet 811$c$ may be discharged to the top chassis 740 as well as the mold frame 824 and the bottom chassis 825 through the conductive tape 835.

In addition, a fixing means for more strongly fixing the conductive tape 835 may be installed in the mold frame 825. For example, the fixing means includes a screw 861 penetrating a top chassis 840, a conductive clip and the mold frame 824. The screw 861 may comprise conductive material so that the electrons may easily move the screw 861.

The conductive screw 861 passes through a first through-hole formed in the top chassis 840 and a second through-hole formed in the conductive clip 860 and is coupled into the groove formed in the mold frame 824. Accordingly, the conductive tape 835 may be electrically connected to the top chassis 840 and the bottom chassis 824 through the conductive clip 860 and the conductive screw 861. Therefore, the light-distribution changing means 822 and the noise shielding sheet 811$c$ may also be connected to earth potential stably.

Although the exemplary embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A backlight assembly for providing a light in a display device, the backlight assembly comprising:
    a light source generating a light;
    a light-distribution changing means changing an optical distribution of the light, the light distribution changing means comprising a light concentrator concentrating the light;
    a noise shielding means shielding a noise generated from an electrical power applied to the light source, the noise shielding means including a transparent conductive member; and
    a receiving container receiving the light source, the light-distribution changing means and the noise shielding means,
    wherein the light concentrator includes a plurality of films having a different refractive index from each other and the noise shielding means is integrally formed with the light concentrator.

2. The backlight assembly of claim 1, wherein the light-distribution changing means further comprises a light diffuser disposed between the light source and the light concentrator to diffuse the light.

3. The backlight assembly of claim 1, wherein the transparent conductive member includes a transparent film and a transparent conductive layer formed on the transparent film.

4. The backlight assembly of claim 3, wherein a surface resistance of the transparent conductive layer is less than about 10 k$\Omega$/m$^2$.

5. The backlight assembly of claim 3, wherein a ground surface resistance of the transparent conductive layer is less than about 50 k$\Omega$/m$^2$.

6. The backlight assembly of claim 1, wherein the light concentrator further comprises an upper member comprised of a first polymer and a lower member comprised of a second polymer opposite to the upper member, the films interposed between the upper member and the lower member, and the transparent conductive member being disposed under the lower member.

7. The backlight assembly of claim 1, wherein the light concentrator further comprises an upper member comprised of a first polymer and a lower member comprised of a second polymer opposite to the upper member, the films being interposed between the upper member and the lower member, and the transparent conductive member being disposed over the upper member.

8. The backlight assembly of claim 2, wherein the light concentrator further comprises an upper member comprised of a first polymer and a lower member comprised of a second polymer opposite to the upper member, and the films being interposed between the upper member and the lower member, and the transparent conductive member including a transparent conductive layer coated on a rear surface of the lower member.

9. The backlight assembly of claim 8, wherein the transparent conductive member further includes a transparent conductive layer coated on an upper surface of the upper member.

10. A liquid crystal display panel for displaying an image, comprising:
    an upper substrate;
    a liquid crystal layer;
    a lower substrate coupled to the upper substrate to receive the liquid crystal layer interposed between the upper substrate and the lower substrate, an electrical power being applied to the liquid crystal layer from an exterior power source to change an arrangement of liquid crystal molecules of the liquid crystal layer;

a polarizing means disposed under the lower substrate; and a noise shielding means integrally formed with the polarizing means to shield a noise generated from an external electric power source, wherein the noise shielding means includes conductive particles scattered into the polarizing means.

11. The liquid crystal display panel of claim 10, wherein the lower substrate includes:

a transparent substrate;

a gate line to which a gate signal is applied, the gate line being formed an the transparent substrate in a first direction;

a data line to which a data signal is applied, the data line being fanned on the transparent substrate in a second direction different from the first direction; and a switching device for controlling an output of the data signal in response to the gate signal, the switching device having a first terminal connected to the gate line and a second terminal connected to the data line.

12. The liquid crystal display panel of claim 10, wherein a light transmissivity of the noise shielding means is no less than about 85% and a surface resistance of the noise shielding means is less than about 10 k$\Omega$/m$^2$.

13. The liquid crystal display panel of claim 10, wherein the noise shielding means further includes a conductive polymer sheet.

14. A liquid crystal display device, comprising:

an liquid crystal display panel displaying an image, the liquid crystal display panel including an upper substrate and a lower substrate coupled to the upper substrate and a liquid crystal layer disposed between the upper substrate and the lower substrate, an electrical power being applied to the liquid crystal layer from an exterior power source to change an arrangement of molecules of the liquid crystal layer;

a backlight assembly providing a first light to the liquid crystal display panel, the backlight assembly including a light source generating a first light, and a light-distribution changing means changing an optical distribution of the first light;

a noise shielding means including a transparent film and a transparent conductive layer formed on the transparent film to shield a noise generated from a power voltage applied to the light source, the noise shielding means being disposed under the lower substrate; and a receiving container receiving the display panel and the backlight assembly, wherein the light-distribution changing means includes a light concentrator having a plurality of films having a different refractive index from each other.

15. The liquid crystal display device of claim 14, wherein the noise shielding means is disposed on a rear surface of the display panel.

16. The liquid crystal display device of claim 14, wherein the display panel further includes a polarizing means disposed under the lower substrate and the noise shielding means is disposed between the lower substrate and the polarizing means.

17. The liquid crystal display device of claim 14, wherein the light-distribution changing means further includes a light diffuser diffusing the first light, and the light concentrator is disposed over the light diffuser and concentrate a second light exiting from the light diffuser.

18. The liquid crystal display device of claim 17, wherein the noise shielding means is disposed between the light diffuser and the light concentrator.

19. The liquid crystal display device of claim 17, wherein the light concentrator further includes an upper member comprised of a first polymer, and a lower member comprised of a second polymer opposite to the upper member, the films being interposed between the upper member and the lower member, and the noise shielding means being interposed between the light diffuser and the lower member.

20. The liquid crystal display device of claim 17, wherein the noise shielding means is disposed under the light diffuser.

21. The liquid crystal display device of claim 17, wherein the light concentrator further includes an upper member comprised of a first polymer, and a lower member comprised of a second polymer opposite to the upper member, the films being interposed between the upper member and the lower member, and the noise shielding means being disposed over the upper member.

22. The liquid crystal display device of claim 17, further comprising a supplementary light diffuser further diffusing the second light, the supplementary light diffuser being disposed under the light concentrator, and the noise shielding means is interposed between the light diffuser and the supplementary light diffuser.

23. The liquid crystal display device of claim 14, wherein the receiving container includes a bottom surface and a plurality of sidewalls extended from an edge portions of the bottom surface, the backlight assembly and the liquid crystal display panel being received in a receiving space defined by the bottom surface and the sidewalls, and the light-distribution changing means and the noise shielding means being electrically connected to at least one of the sidewalls.

24. The liquid crystal display device of claim 23, wherein the receiving container includes:

a first receiving container receiving the backlight assembly, the first receiving container having a bottom surface and a plurality of sidewalls extended from the bottom surface, and the backlight assembly being received in a receiving space defined by the bottom surface and the sidewalls; and a second receiving container receiving the liquid crystal display panel, the second receiving container having a plurality of sidewalls to form an inner space, the second receiving container having a stepped portion extended toward the inner space from a top portion of each of the sidewalls, the liquid crystal display panel being supported by the stepped portion, an effective display region being exposed by the second receiving container.

25. A liquid crystal display device, comprising:

an liquid crystal display panel displaying an image, the liquid crystal display panel including an upper substrate and a lower substrate coupled to the upper substrate and a liquid crystal layer disposed between the upper substrate and the lower substrate, an electrical power being applied to the liquid crystal layer from an exterior power source to change an arrangement of molecules of the liquid crystal layer;

a backlight assembly providing a first light to the liquid crystal display panel, the backlight assembly including a light source generating a first light, a light-distribution changing means changing an optical distribution of the first light;

a noise shielding means shielding a noise generated from an power voltage applied to the light source, the noise shielding means being disposed under the lower substrate;

a receiving container receiving the display panel and the backlight assembly;

a polarizing means disposed under a rear surface of the noise shielding means, the polarizing moans having an opening to expose a portion of the noise shielding means, the portion corresponding to a non-effective display region of the lower substrate; and a connector connecting the noise shielding means to an earth potential, a first end of the connector being connected to the noise shielding means through the opening of the polarizing means, and a second end of the connector being electrically connected to the receiving.

26. The liquid crystal display device of claim 25, wherein the connector is secured with the receiving container by a fixing means.

27. The liquid crystal display device of claim 26, wherein the fixing means includes a conductive clip or a conductive screw.

28. A backlight assembly for providing a light in a display device, the backlight assembly comprising:

a light source generating a first light;

a light diffuser disposed over the light source to diffuse the first light exiting from the light source;

a supplementary light diffuser disposed over the light diffuser to further diffuse the second light exiting from the diffuser:

a light concentrator disposed over the supplementary light diffuser to concentrate the second light;

a noise shielding means shielding a noise generated from an electrical power applied to the light source, the noise shielding means including a transparent conductive member: and a receiving container receiving the light source, the light diffuser, the supplementary light diffuser, the light concentrator, and the noise shielding means:

wherein, the transparent conductive member is disposed adjacent to the supplementary light diffuser.

29. The backlight assembly of claim 28, wherein the transparent conductive member includes a transparent film and a transparent conductive layer formed on the transparent film.

30. The backlight assembly of claim 28, wherein the transparent conductive member includes a transparent conductive layer coated on at least one of a rear surface and a front surface of the supplementary light diffuser.

* * * * *